United States Patent [19]

Tadamura et al.

[11] Patent Number: 5,761,405
[45] Date of Patent: Jun. 2, 1998

[54] DATA INTEGRITY GUARANTEE SYSTEM

[75] Inventors: Katsumi Tadamura, Shobara; Masakazu Okada, Katsuta; Syoji Yamaguchi, Hitachi, all of Japan

[73] Assignee: Hitachi, Ltd., Tokyo, Japan

[21] Appl. No.: 407,241

[22] Filed: Mar. 20, 1995

Related U.S. Application Data

[63] Continuation of Ser. No. 810,376, Dec. 19, 1991, abandoned.

[30] Foreign Application Priority Data

Dec. 19, 1990 [JP] Japan ................................ 2-403743

[51] Int. Cl.⁶ .................................................. G06F 11/20
[52] U.S. Cl. .......................... 395/182.16; 395/182.02; 395/182.13; 370/219; 370/220; 370/227; 370/228
[58] Field of Search .................. 395/182.08, 182.09, 395/182.11, 182.12, 182.14, 182.16, 182.15, 182.02, 182.17, 182.18, 182.19; 370/216–228

[56] References Cited

U.S. PATENT DOCUMENTS

| | | |
|---|---|---|
| 3,964,056 | 6/1976 | Charpentier et al. |
| 4,055,808 | 10/1977 | Holsinger et al. ........................... 375/8 |
| 4,947,317 | 8/1990 | Diginlio et al. ........................... 364/200 |
| 5,119,488 | 6/1992 | Takamatsu et al. ...................... 395/575 |
| 5,138,701 | 8/1992 | Ohira et al. ............................... 395/200 |
| 5,157,663 | 10/1992 | Major et al. .............................. 371/9.1 |
| 5,396,485 | 3/1995 | Ohno et al. ............................... 370/217 |
| 5,426,774 | 6/1995 | Bannerjee et al. ...................... 395/182.14 |

FOREIGN PATENT DOCUMENTS

| | | |
|---|---|---|
| 2486291 | 7/1980 | France. |
| WOA8900312 | 1/1989 | WIPO. |

*Primary Examiner*—Robert W. Beausoliel, Jr.
*Assistant Examiner*—P. Vales
*Attorney, Agent, or Firm*—Antonelli, Terry, Stout, & Kraus, LLP

[57] ABSTRACT

The main storage, the communication interface portion and the circuit control module hold transmission data in the buffers until completion of the transmission has been confirmed. When a fault has occurred in the current operating system of the duplexed portions in the configuration elements of the host computer and the multi-circuit control unit, the duplexed portions are changed over from the current operating system to the stand-by system. In this case, information for reproducing data that has been lost due to the change-over is transmitted from the main storage and the circuit control module to the communication interface portion which has become the new current operating system. The communication interface portion which has become the new current operating system restarts the processing based on this information. Data integrity is guaranteed for the data of both directions of transmission and receiving between the host computer and the terminal without mutually confirming the state of data communications before the occurrence of the fault between the terminal and the host computer after the occurrence of the fault. Information exchanges of layer 3 or above are not carried out between the host computer and the terminal. Therefore, overhead of data communications can be minimized.

34 Claims, 16 Drawing Sheets

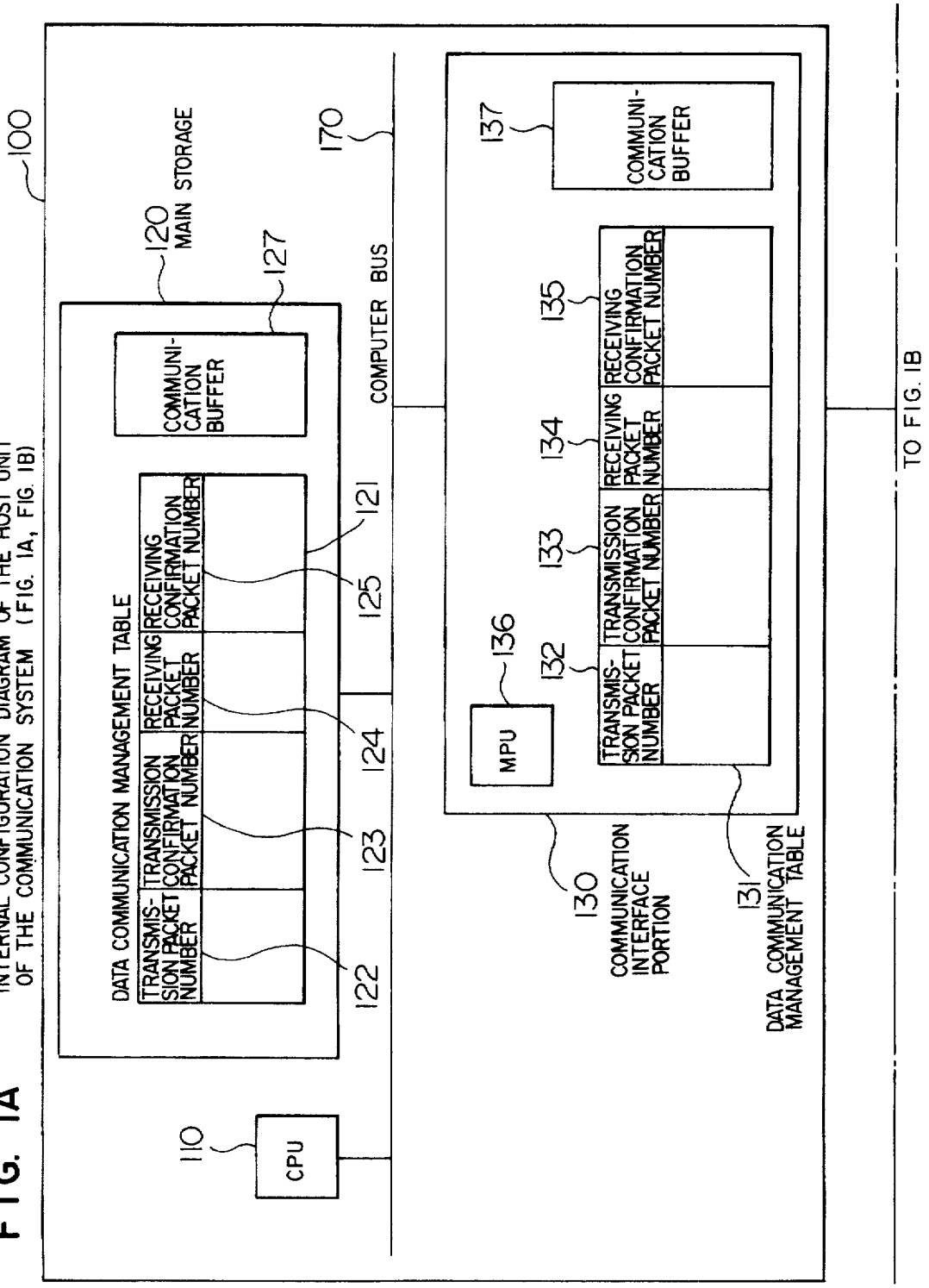

SCHEMATIC DIAGRAM OF THE CONFIGURATION OF THE COMMUNICATION SYSTEM

INTERNAL STRUCTURE DIAGRAM OF
THE PROGRAM OF THE COMMUNICATION
INTERFACE PORTION

INTERNAL STRUCTURE DIAGRAM OF THE PROGRAM OF THE CIRCUIT CONTROL MODULE

DATA TRANSMISSION PROCESSING FLOW OF THE COMMUNICATION INTERFACE PORTION

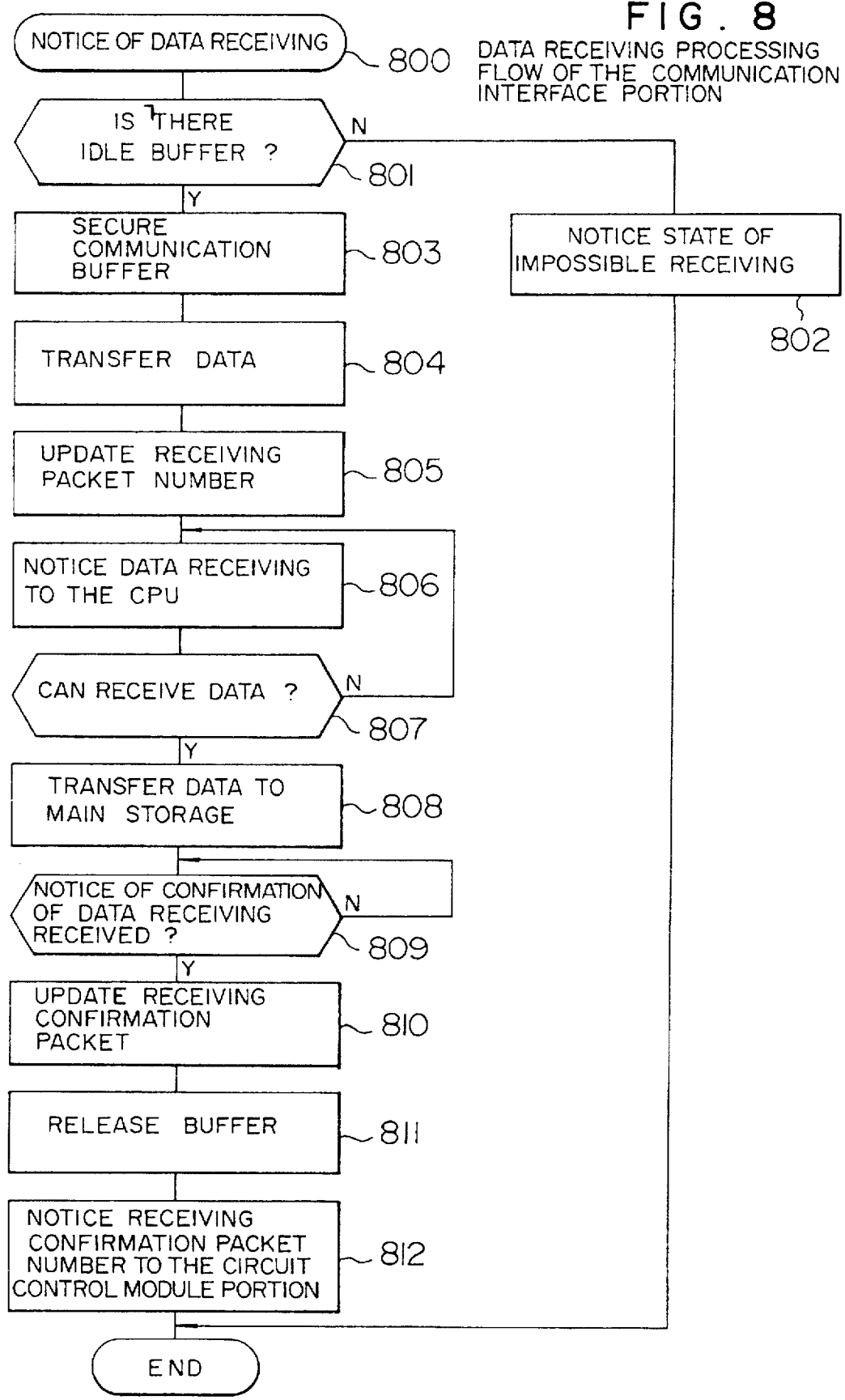
FIG. 8 DATA RECEIVING PROCESSING FLOW OF THE COMMUNICATION INTERFACE PORTION

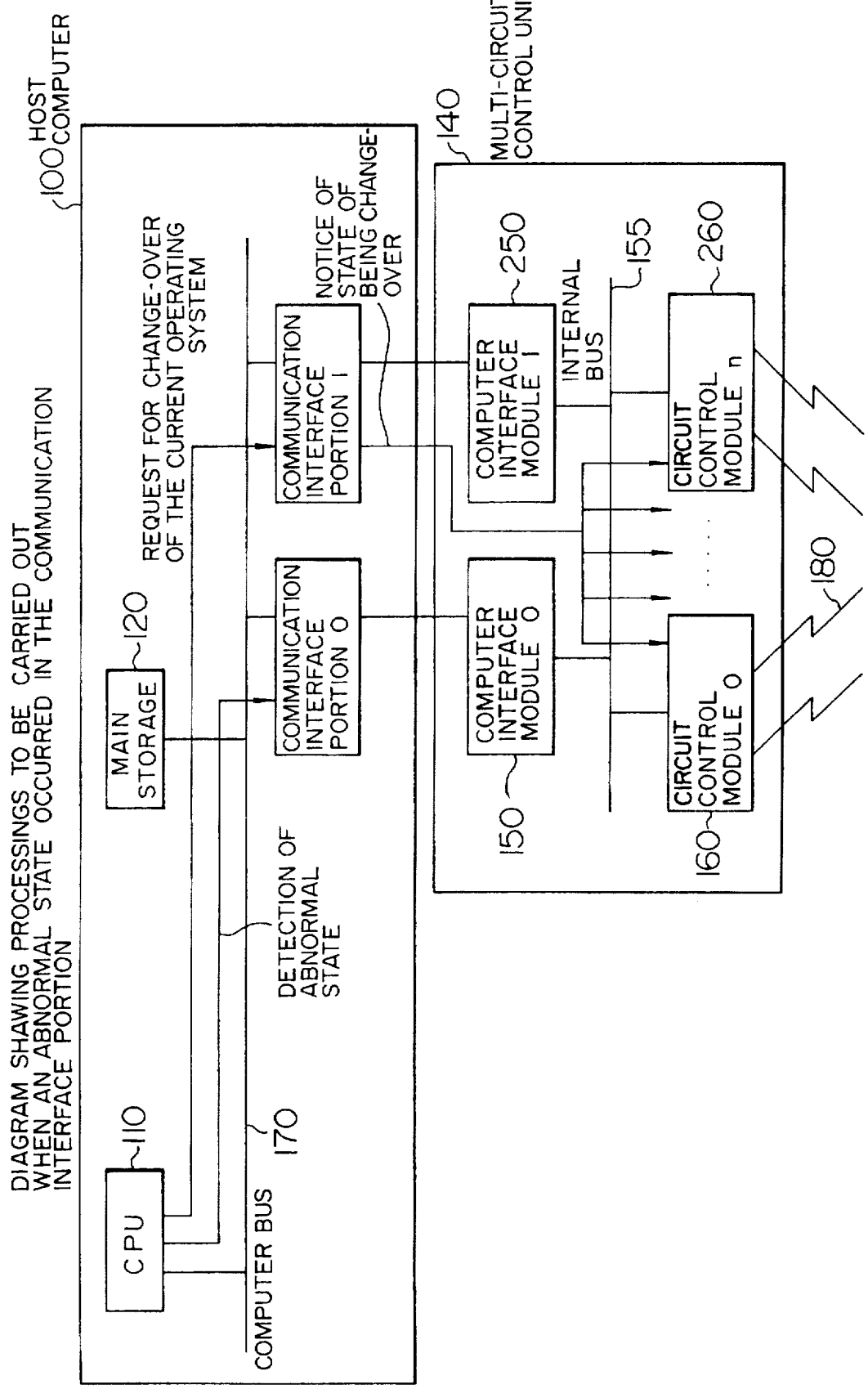
FIG. 9 DIAGRAM SHOWING PROCESSINGS TO BE CARRIED OUT WHEN AN ABNORMAL STATE OCCURRED IN THE COMMUNICATION INTERFACE PORTION

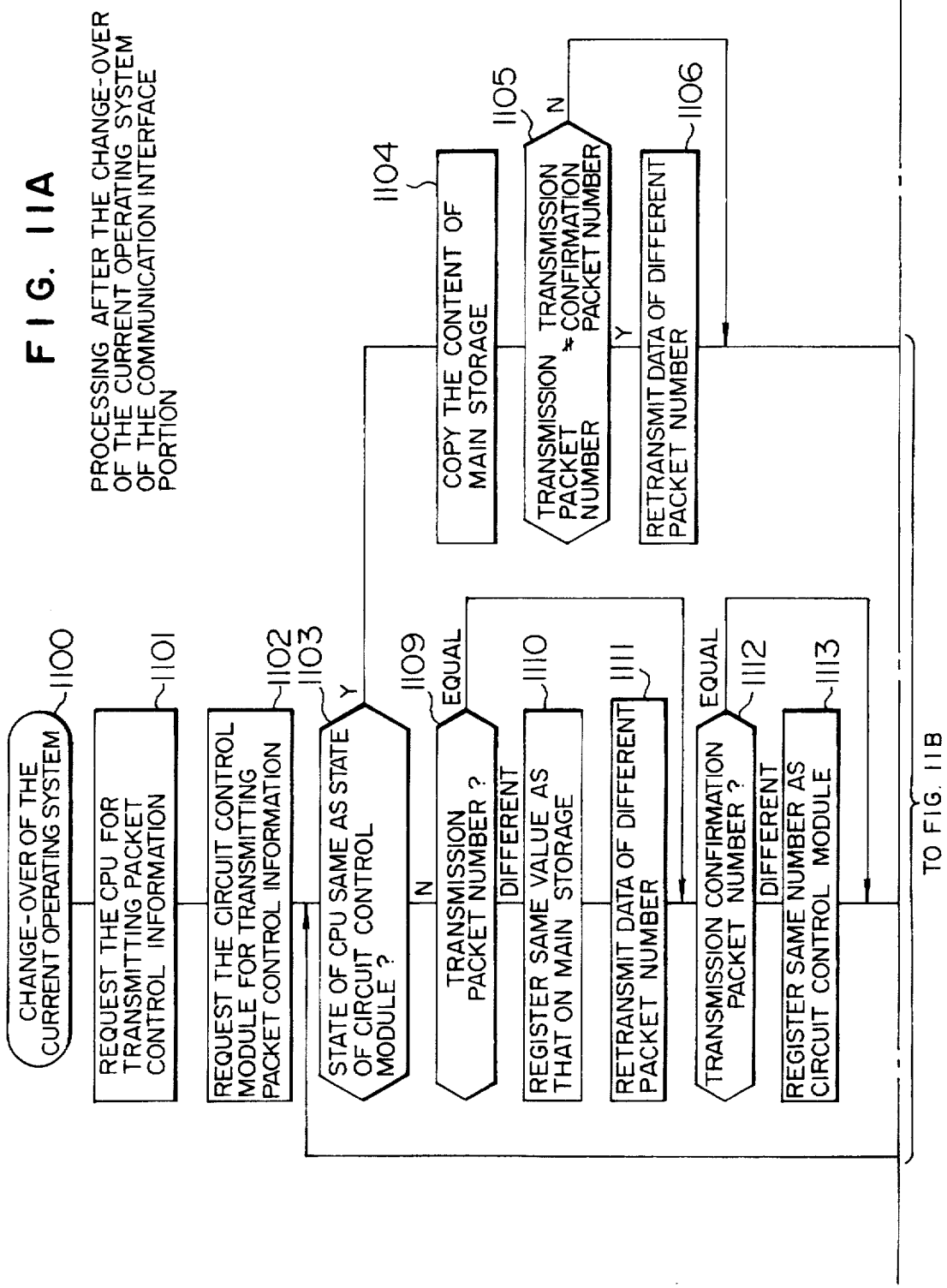

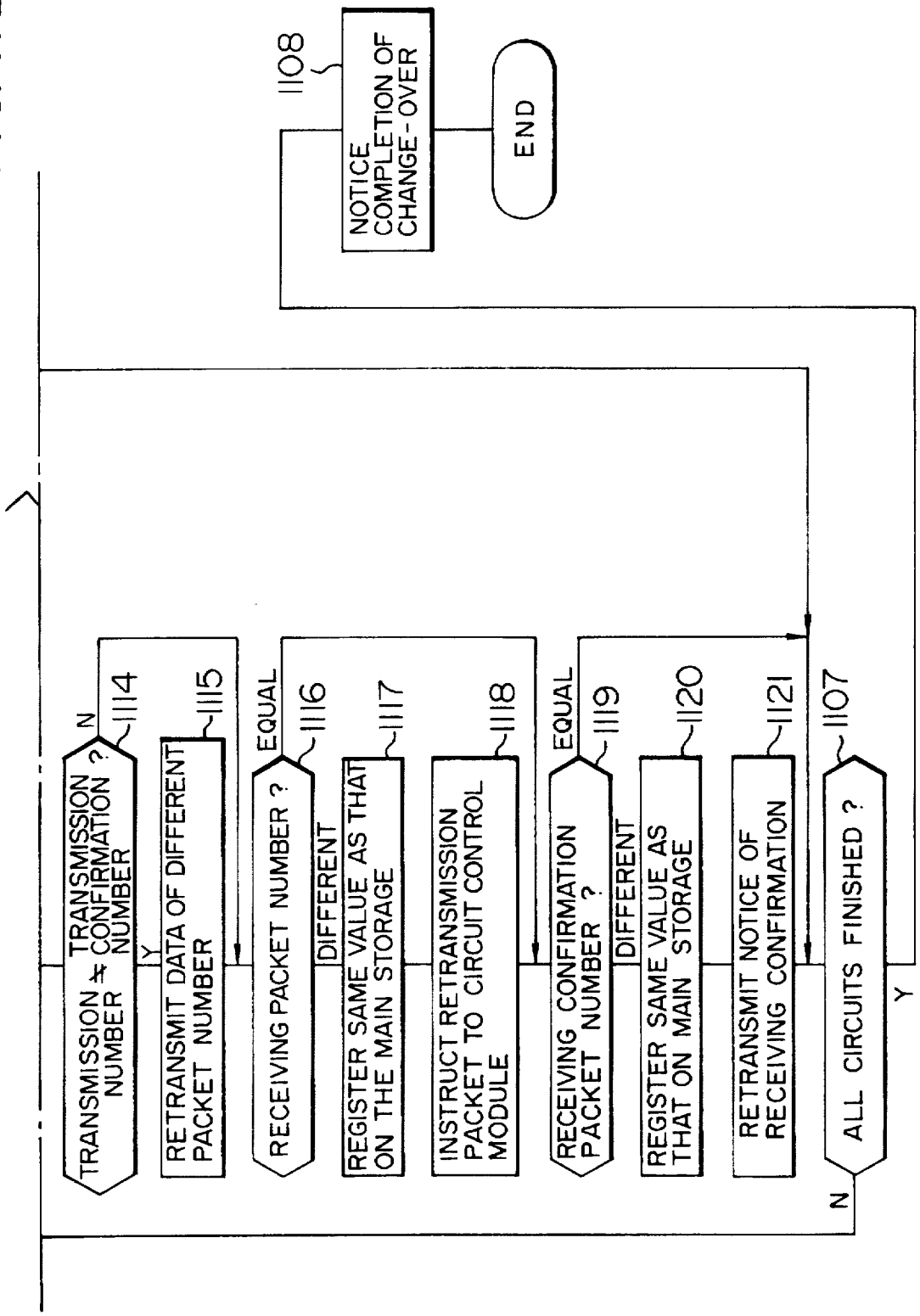

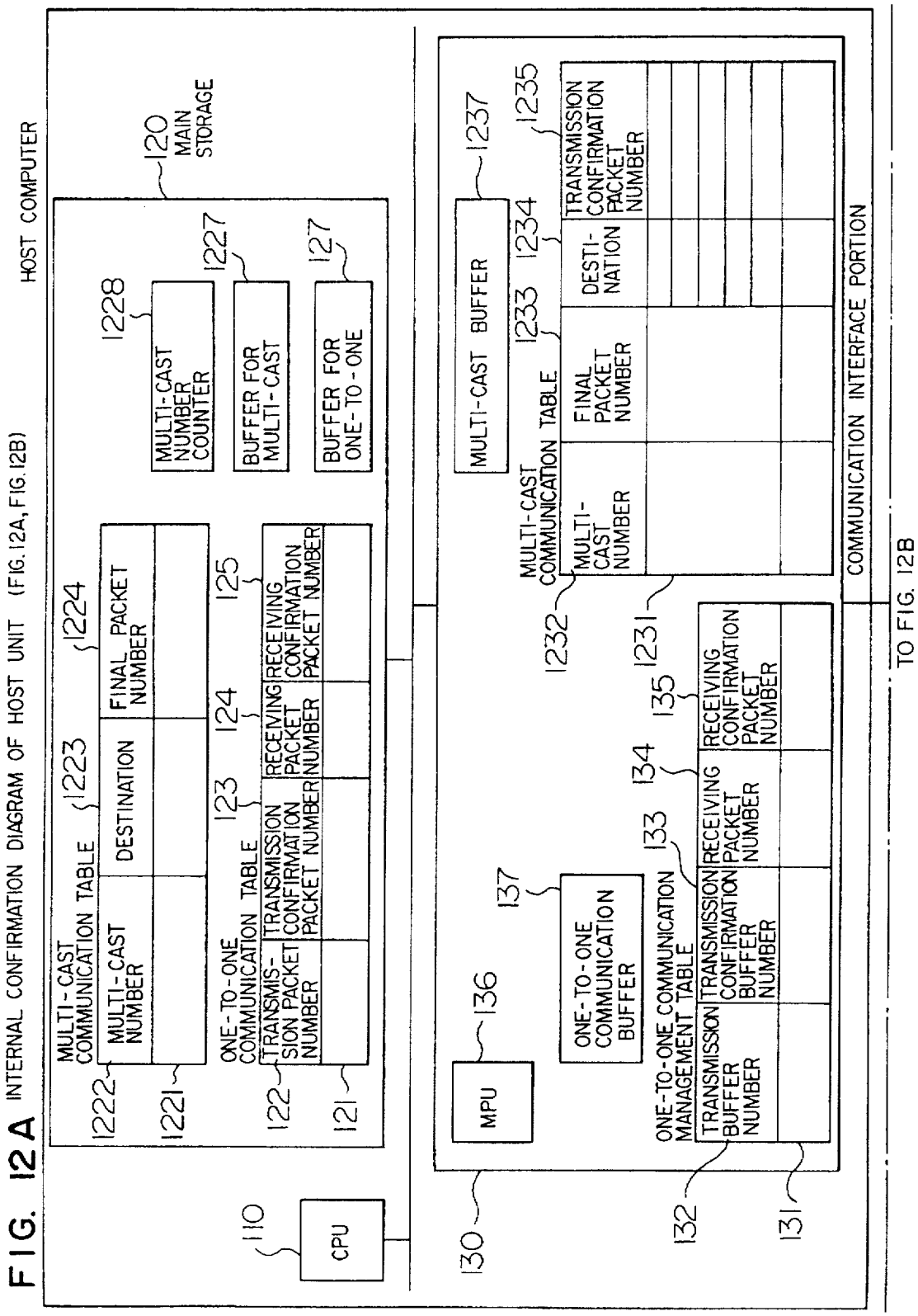

1

DATA INTEGRITY GUARANTEE SYSTEM

This application is a continuation of application Ser. No. 07/810,376 filed on Dec. 19, 1991, now abandoned.

BACKGROUND OF THE INVENTION

The present invention relates to a data transmission system covering a host computer to a communication circuit in an information service system for providing real-time information to users, and more particularly, to a data integrity guarantee system which is suitable for application to the case where the hardware for communication control of the host computer is multiplexed and also this hardware is operated in the form of current and stand-by systems.

A conventional method for guaranteeing continuity of output data when a current operating system is being changed over to a stand-by system in a duplex system is described in, for example, the Japanese Patent Application Laid-Open No. 63-61339. According to this prior-art system, a change-over from the current operating system to the stand-by operating system is carried out manually, and data such as receiving data, transmission data and an address to be transmitted for providing an inter-system link is transferred from the current operating system to the stand-by system, and after that the system is changed over. As described above, according to the prior-art technique, continuity of output data has been guaranteed by relaying the information of transmission data from the current operating system to the stand-by system when the system is changed over.

The above prior-art technique, however, is valid only when the change-over from the current operating to the stand-by systems is carried out manually. For example, according to this system, there is no guarantee that data for providing an inter-system link can always be transferred to the stand-by system when a fault has occurred in the current operating system. When such a fault has occurred, this prior-art technique has not been able to be applied to the system change-over.

Further, according to the above prior-art technique, although data continuity can be guaranteed in the data transfer from the host computer to a terminal unit there is no guarantee of data continuity in the data transfer from the terminal unit to the host computer. Accordingly, when a fault has occurred in one of the systems of the internally duplexed host computer, data transmitted from the user at the terminal unit is lost even if the system application is possible.

SUMMARY OF THE INVENTION

In a data communication system having a host computer as a center, when a fault has occurred in the current operating system in the duplexed structure of the host computer and the current operating system is to be changed over to the stand-by system, it is a first object of the present invention to guarantee data integrity for the data of both transmitting and receiving directions between the host computer and the terminal unit, without requiring a mutual confirmation of the state of data communications between the terminal unit and the host computer before the fault has occurred.

It is a second object of the present invention to guarantee data integrity in communication services in a data communication system in which there are two types of communication services, that is a one-to-one communication service where data are transmitted between the host computer and one terminal unit and a multi-cast communication service where data are transmitted simultaneously from the host computer to a plurality of terminal units.

It is a third object of the present invention to minimize data to be transferred from other portions to the new current operating system for the purpose of guaranteeing data integrity, when a fault has occurred in the current operating system and the stand-by system is to be used as a new current operating system to continue the communications.

It is a fourth object of the present invention to minimize the number of communications between the CPU and the communication interface portion to control the communication buffer for holding data to guarantee data integrity, and to reduce overhead for the control of the communication buffer.

In order to achieve to above first and third objects of the present invention, the CPU and the communication interface portion of the host computer and the circuit control module of the multi-circuit control unit carry out the following controls.

A. Carries out sequential control of transmission and receiving data in the unit for transmitting through the data transmission path.

B. Detects unit of minimum transmission packet of data stored in the communication buffer.

C. Stores how many packets of data have been transmitted or received, based on packet numbers continuously attached to the transmission or receiving packets.

D. Holds data received from the upstream of the data transmission path, in the communication buffer, even after the data has been transmitted to the downstream.

E. Upon receiving notice of completion of data transmission from the downstream of the data transmission path, reports the completion of the data transmission to the upstream.

F. Releases data held in the communication buffer, upon receiving the notice of completion of data transmission from the downstream.

The circuit control module carries out the following controls.

A. Stops data transmission to the communication interface portion until the circuit control module receives a signal which notifies that communication is possible, when the circuit control module detects an occurrence of a fault in the communication interface portion.

B. Receives only a specific instruction from the communication interface portion according to an instruction from the communication interface portion.

The communication interface portion carries out the following controls.

A. Notice's the state of the preparation of restarting communications to the circuit control module, when the current operating system has been changed over to the stand-by system.

B. Requests each circuit control module to transmit information relating to data packet held in the communication buffer of the circuit control module, when the current operating system has been changed over to the stand-by system.

C. Notices the circuit control module the state that it has become possible to transmit to the communication interface portion, when the current operating system has been changed over to the stand-by system to make it possible to start communications.

D. Receives from the CPU the information relating to the data packet held in the communication buffer of the CPU, when the current operating system has been changed over to the stand-by system.

E. Reproduces information relating to the data packet for the communication interface portion from the information relating to the data packet collected from the CPU and the circuit control module, when the current operating system has been changed over to the stand-by system.

F. When the packet number of the transmission completion notice received by the circuit control module is different from the packet number of the received transmission completion notice held by the CPU as a result of the information reproduced in E above, resumes the communications by assuming that the communication interface portion has received the transmission completion notice up to the packet number of the transmission completion notice received by the circuit control module, and then reports the CPU about the completion of the transmission by that amount.

G. Requests the CPU, by designating the packet number, to retransfer the data held in the communication buffer of the communication interface portion, based on the information reproduced in E above.

The CPU carries out the following controls.

A. Transmits the information relating to the data packet held in the communication packet of the CPU to the communication interface portion, when the communication interface portion has been changed over from the current operating system to the stand-by system.

B. Retransmits to the communication interface portion the data of the packet number which has been requested to be transmitted by the communication interface portion.

In order to achieve the above second object of the present invention, the CPU further carries out the following control.

A. Carries out a multi-cast transmission to transmit the same data to a plurality of circuits.

The CPU and the communication interface portion further carry out the following controls.

A. Discriminate between the data for a multi-cast transmission and the data for a one-to-one transmission and manage these by providing independent sequential numbers to these data.

B. Store the destinations of a multi-cast transmission and hold the data for the multi-cast transmission in the communication buffer until the notice of completion of the data transmission has been received from all the destinations.

The circuit control module further carries out the following control.

A. Identifies whether the data packet received from the communication interface is based on the multi-cast transmission or the one-to-one transmission, and stores the result.

In order to achieve the above fourth object, the communication interface portion further carries out the following controls.

A. Divides the data transmitted from the CPU into packets for transmission to the circuit.

B. Allocates sequential numbers to the divided packets.

C. Corresponds the data name of the data transmitted from the CPU to the final sequential numbers allocated to the divided packets, and stores the result.

D. Rearranges the transmission completion notice received in packets from the circuit control module in the data unit of the data transmitted from the CPU.

By carrying out the above-described controls, the following overall operation can be obtained.

[I. Data transmission to the terminal]

Before data is transmitted from the host computer to the terminal, the CPU detects the number of packets of the data to be transferred and advances the sequential number of the transmission data for each circuit by the number of transmission packets. The CPU stores this number as the latest transmission packet number. Then, the CPU notices the occurrence of the request for data transmission, to the communication interface portion of the host computer. Upon detecting the request for data transmission from the CPU, the communication interface portion inputs data from the main storage to the communication buffer held inside the communication interface portion, and stores the data in this communication buffer. In this case, the communication interface portion holds the data without releasing the communication buffer of the main storage. The communication interface portion notices the state of the occurrence of the request for data transmission by each one packet, to the circuit control module of the multi-circuit control unit connected to the communication interface portion which controls the circuit for which the data transmission request was made. In this case, the communication interface portion stores for each circuit the packet number of the packet which has been sent last to the circuit. Upon detecting the request for data transmission from the communication interface portion, the circuit control module inputs the data from the communication buffer of the communication interface portion to the communication buffer held inside the circuit control module, and stores the data in this communication buffer. Each time the circuit control module transmits data of one packet, the circuit control module updates the packet number of the packet which has been transmitted last to the circuit. When the data transmission from the communication buffer of the communication interface portion to the communication buffer of the circuit control module has been completed, the circuit control module notices the completion of data transmission to the communication interface portion. Upon receiving the notice of the completion of data transmission, the communication interface portion releases the communication buffer which stores the data of which completion of the transmission has been confirmed. Upon receiving the notice of confirmation of the completion of data transmission to the circuit from the terminal, the circuit control module releases the data held on the communication buffer of the circuit control module. Then, the circuit control module notices the receiving of the notice of confirmation of the completion of data transmission from the terminal, to the communication interface portion. Upon receiving the notice of confirmation of the completion of data transmission, the communication interface portion decides whether the communication interface portion has received the notice of confirmation of the completion of data transmission by the number of packets which have been received from the CPU. When the decision is given that the communication interface portion has received the notice of confirmation of the completion of data transmission by the number of packets received from the circuit control module, the communication interface portion notices the confirmation of the completion of data transmission to the CPU. When the CPU has received the notice of confirmation of the completion of data transmission from the communication interface portion, the communication interface portion releases the communication buffer on the main storage holding the data of which transmission has been completed.

[II. Data receiving from the terminal]

Upon receiving data from the terminal, the circuit control module of the multi-circuit control unit updates the received packet number and stores the received data in the communication buffer on the circuit control module. Then, the circuit control module notices the data receiving from the terminal, to the communication interface portion of the host computer. Upon detecting the data receiving from the terminal, the communication interface portion inputs the received data from the communication buffer of the circuit control module to the communication buffer on the communication interface portion. Then, the communication interface portion updates the received packet numbers managed in the communication interface portion, and then notices the occurrence of data receiving from the terminal, to the CPU. Upon detecting the receiving of data from the terminal, the CPU inputs the received data to the communication buffer on the main storage from the communication buffer of the communication interface portion. Then, the CPU updates the received packet number managed by the CPU and then notices the confirmation of the completion of data transmission to the communication interface portion. Upon detecting the confirmation of the completion of data transmission, the communication interface portion releases the data for which confirmation of transmission has been received, from the communication buffer. Then, the communication interface portion notices the confirmation of the completion of communications to the circuit control module. Upon detecting the notice of the completion of data transmission, the circuit control portion releases the internal communication buffers which store the corresponding data.

[III. Operation when an abnormal state has occurred in the communication interface portion]

When an abnormal state has occurred in the communication interface portion of the host computer, the CPU detects the abnormal state and changes over the communication interface portion from the current operating system to the stand-by system. In this case, the communication interface portion of the new current operating system notices the circuit control module of the multi-circuit control unit that the restarting of the communication is being prepared in the new current operating system. Upon detecting the occurrence of an abnormal state of communications when starting communications with the communication interface portion, the circuit control module changes over the state to restrict the communications with the communication interface portion until there is a notice that it is possible to restart the communications after the communication interface portion has been changed over to the new current operating system. When the communication interface portion has been changed over to the new current operating system, the communication interface of the new current operating system requests the CPU to transmit information relating to the data packet of the communication buffer on the main storage which is being managed by the CPU. Then, the communication interface of the new current operating system requests each circuit control module to transmit information relating to the data packet of the communication buffer of the circuit control module. The communication interface compares the data relating to the data packet of the communication buffer in the CPU and the circuit control module, and reproduces the information which has been lost by the change-over of the communication interface portion. When it is necessary to retransmit the data from the main storage as a result of the reproduction of the information, the communication interface requests the CPU to retransmit the data by designating the packet number to be retransmitted. The CPU retransmits the data of the packet number of which retransmission has been requested, from the communication buffer on the main storage. When it has become possible to restart the communications, the communication interface portion notices each circuit control module that it has become possible to restart the communications. As described above, even if the circuit control module has tried to communicate with the communication interface portion during the change-over processing of the communication interface portion, the circuit control module can start communications by waiting until the change-over operation has been completed.

According to the present invention, data integrity can be guaranteed for the normal data communications. Therefore, it is not necessary to control by using layer 3 information between the host computer and the terminal, so that data integrity can be guaranteed by minimizing the overhead of the data communication. Further, a part of the host computer and the multi-circuit control unit has a duplex structure so that communications can be continued by changing over the current operating system even if there occurs an abnormal state at the portion of the duplexed structure. Further, lost data can be reproduced by changing over the current operating system, so that there is no such a state that data being communicated with the user is lost due to a fault of the host computer or the user can not use the communication system during a predetermined period. Further, according to the present invention, data integrity can be guaranteed in the communication system which covers both one-to-one communications and multi-cast communications. Therefore, a wide communication function can be offered to the users of this communication system without deteriorating the reliability of communications.

BRIEF DESCRIPTION OF THE DRAWINGS

FIGS. 1A, 1B are diagrams of the internal configuration of the host unit of the communication system;

FIG. 8 is a flow chart for showing the data receiving processing of the communication interface portion;

FIG. 9 is a diagram for showing the information flow when the CPU or the circuit control module has detected an occurrence of an abnormal state in the communication interface portion or the computer face module;

FIGS. 11A and 11B are flow chart for showing the processing after the communication interface portion has been changed over to a current operating system; and FIGS. 12A and 12B are configuration diagram of the host unit in another embodiment of the present invention.

DESCRIPTION OF THE PREFERRED EMBODIMENTS

One embodiment of the present invention will be explained below with reference to the drawings.

Figure 2:
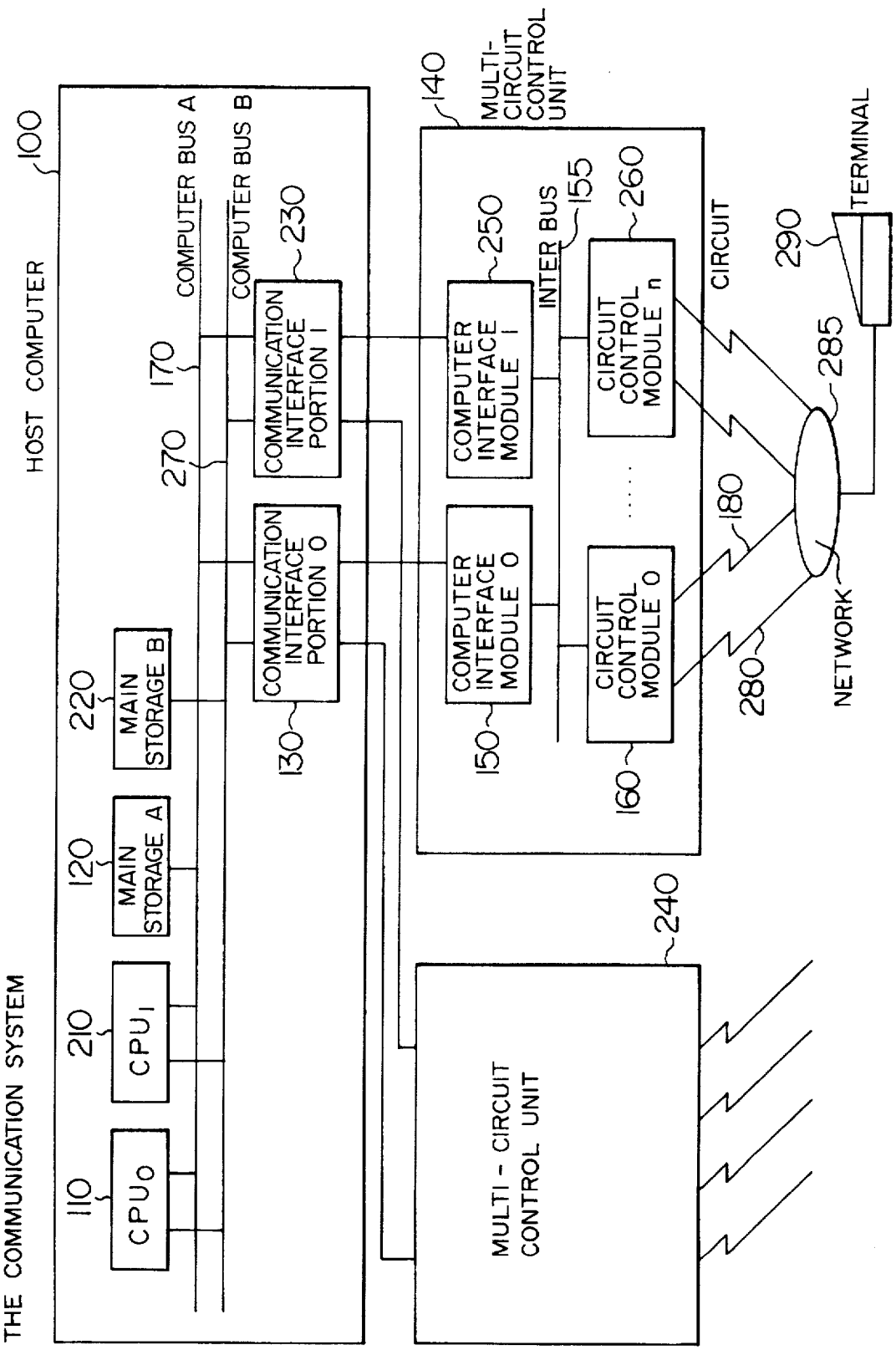
FIG. 2 is a schematic diagram of the configuration of the communication system in one embodiment of the present invention.

FIG. 2 shows the schematic configuration of the communication system in one embodiment of the present invention and the internal structure of a host computer 100 and a multi-circuit control unit 140 of the host unit. This communication system comprises the host unit (a data server) including the host computer 100 and the multi-circuit control unit 140 and a terminal 290 (a data client) which is connected with the host unit through a network 285. A plurality of multi-circuit control units 140 are connected to the one host computer 100 to control a plurality of circuits 180 (the terminal 290) with one multi-circuit control unit 140. The host computer 100 has a duplexed structure of the internal elements such as CPU's 110 (210), main storages 120 (220), communication interface portion 130 (230), computer buses 170 (270), etc., to enable one of the duplexed elements to continue the normal operation even if the other element is in a fault (a fault tolerant computer). The multi-circuit control unit 140 has a computer interface module 150 connected with the communication interface portion 130 of the host computer 100 through an interface cable 190, thus having the computer interface module 150 by corresponding at 1:1 to the duplexed communication interface portion 130. Inside the multi-circuit control unit 140, the computer interface module 150 and a circuit control module 160 are connected to an internal bus 155. The circuit control module 160 controls one or a plurality of circuits 180 and is connected to the terminal 290 through the circuit 180 and a network 285. The communication interface portion 130 of the host computer 100 works as a current operating system and the communication interface portion 230 works as a stand-by system. Accordingly, the computer interface modules 150 and 250 of the multi-circuit control unit 140 work as the current operating system and a stand-by system respectively to correspond to the communication interface portions 130 and 230 respectively. In other words, of the two computer interface modules connected to the internal bus 155 of the multi-circuit control unit 140, only the current operating system is accessible. When the communication interface portion 130 as the current operating system has been in fault and this system has been changed over to the communication interface portion 230 as the stand-by system, the computer interface module is also changed over from the current operating system 150 to the stand-by system 250. Similarly, when a fault has occurred in the current operating system 150 of the computer interface module of the multi-circuit control unit, both the communication interface portion and the computer interface module are also changed over from the current operating system to the stand-by system. Between the circuit control module 160 and the terminal 290, protocols up to the protocol of the data link level of data communication (layer 2 of the seven-hierarchical protocol model of the OSI) are supported. Protocols of layer 3 and above between the terminal and the host unit are controlled by the program which operates on the CPU 110 in the host unit. In transmitting data from the communication interface portion 130 to the main storage 120, the same data is transmitted to both of the duplexed main storages 120 and 220 through the duplexed computer bus 170.

Figure 1B:
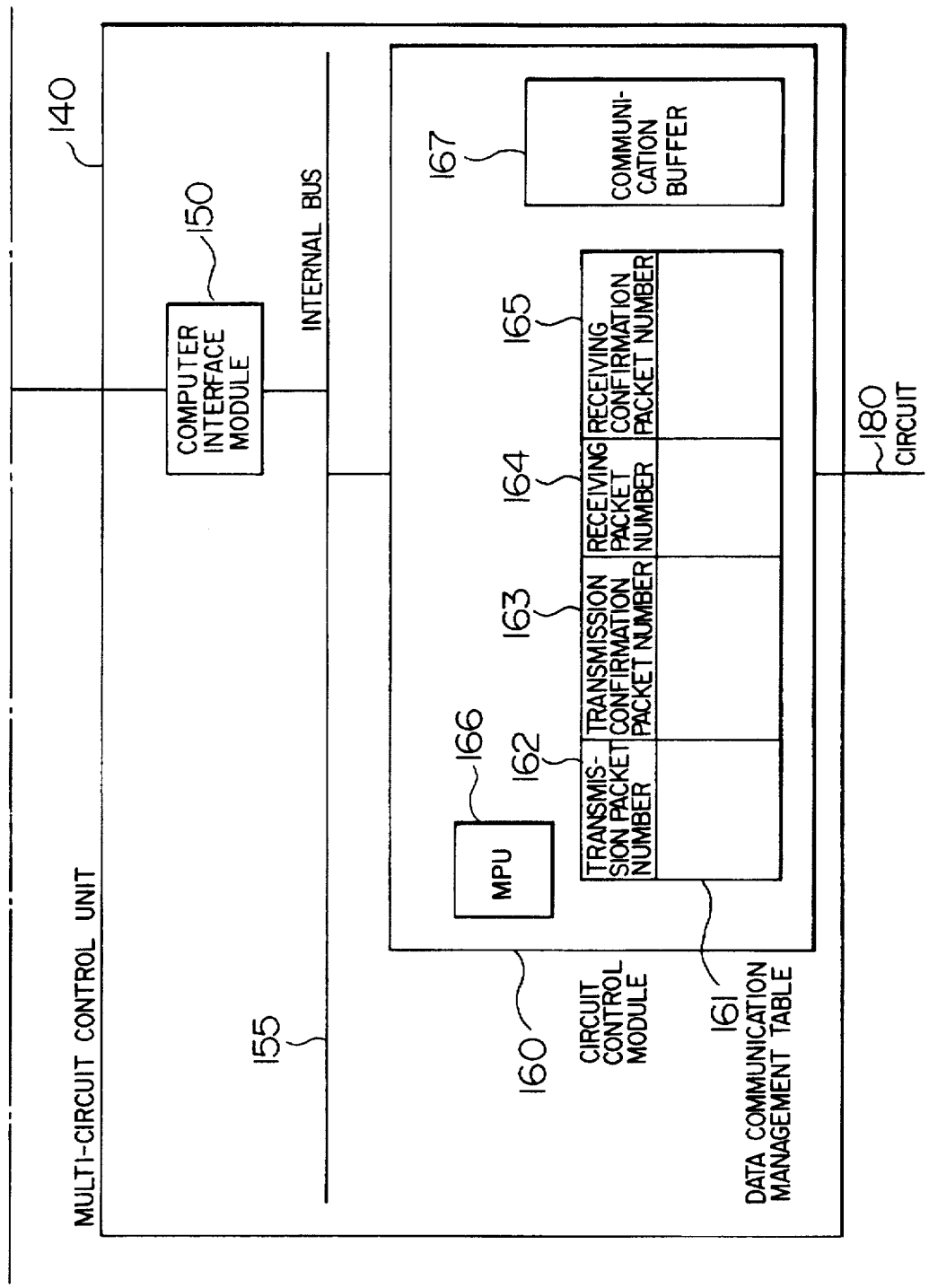

FIGS. 1A and 1B show the internal structure of the host unit in the communication system in one embodiment of the present invention. The host unit has a data communication management table for managing a transmission packet number, a receiving packet number and the idle state of the communication buffers managed at each portion, in each of the main storage 120, the communication interface portion 130 and the circuit control module 160. A data communication management table 121 on the main storage includes a transmission packet number 122, a number of empty buffers for transmission data 123, a receiving packet number 124 and a number of empty buffers for receiving data 125, and this table is managed by the program operated on the CPU 110. A data communication management table 131 on the communication interface portion 130 is managed by the program operated on a microprocessor 136 which controls the communication interface portion. A data communication management table 161 on the circuit control module 160 is managed by the program operated on a microprocessor 166 which controls the circuit control module.

Figure 3:
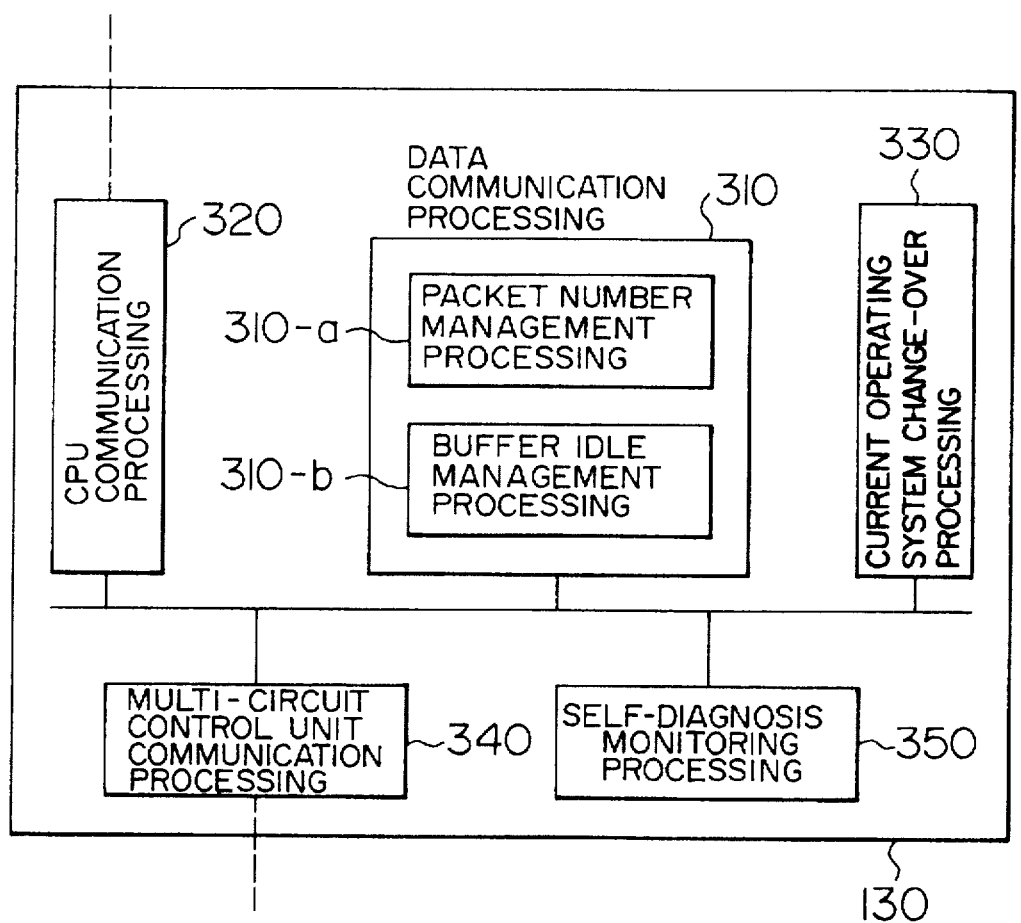
FIG. 3 is a structure diagram of the program which operates on the microprocessor of the communication interface portion.

FIG. 3 is a block diagram for showing the internal structure of the program operated on the microprocessor 136 of the communication interface portion 130. This program can be broadly divided into the processing for data communication control, the processing for changing over the system and the system for self-diagnosis and monitoring of the multi-circuit control unit. The processing for data communication control includes a CPU communication processing 320 for controlling the communications with the CPU 110, a communication processing 340 of the multi-circuit control unit for controlling the communications with the multi-circuit control unit 140, and a data communication processing 310 for controlling the packet division and sequence. The data communication table 131 is operated by the data communication processing 310. The data communication processing 310 is further divided into a packet number management processing 310-a for placing a sequential number to the transmission packet and the receiving packet respectively and storing the latest transmission and receiving numbers and a buffer idle management processing 310-b for managing the idle buffers for transmission and receiving data. The current system change-over processing 330 is the processing for the new current operating system of the communication interface portion to instruct restriction of data transmission to the circuit control module 160 of the multi-circuit control unit 140 and to instruct transmission of packet control information to the circuit control module 160 in order to reproduce information which has been lost due to the change-over. In the diagnosis and monitoring processing 350, the communication interface portion 130 monitors the state of all the modules of the communication interface portion 130 itself and the multi-circuit control unit 140 which is connected to the communication interface portion. When an abnormal state has been detected, the communication interface portion 130 notices the portion of the occurrence of the fault to the CPU 110.

Figure 4:
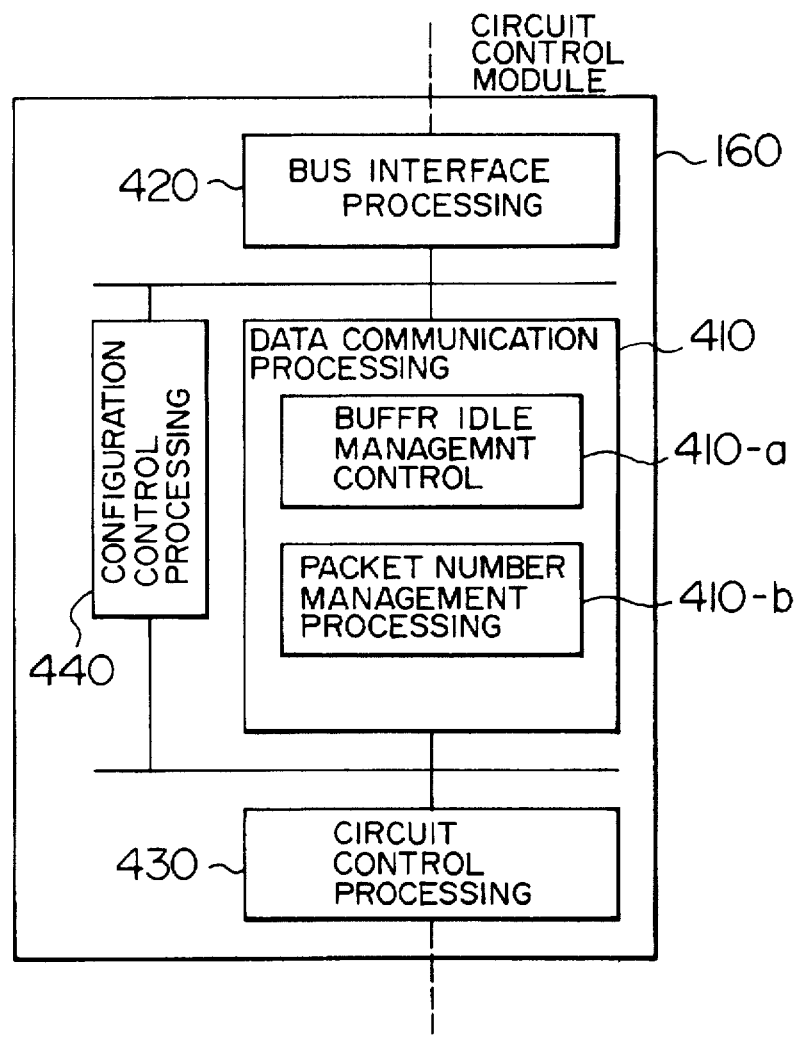
FIG. 4 is a structure diagram of the program which operates on the microprocessor of the circuit control module.

FIG. 4 is a block diagram for showing the structure of the program which is operated on the microprocessor 166 of the circuit control module 160. This program includes a data communication processing 410, a bus interface processing 420, a circuit control processing 430 and a structure control processing 440. The data communication management table 161 on the circuit control module 160 is managed by a packet number management processing 410-a and a buffer idle management processing 410-b of the data communication processing 410. In the bus interface processing 420, communications with the communication interface portion 130 is controlled. In the circuit control processing 430, protocol control of the data link level (for example, HDLC) with the terminal is carried out through the circuit 180, and the result of data transmission to the circuit and the result of data receiving from the circuit are noticed to the data communication processing 410. In the structure control processing 440, an occurrence of a fault in the communication interface portion or the computer interface module 150 is recognized and a processing at the time of a fault and stopping or restarting of relevant data communications are carried out.

Flows of processings in the communication interface portion 130 and the circuit control module 160 at the time of transmission and receiving of data will be explained with reference to FIGS. 5 to 8.

Figure 5:
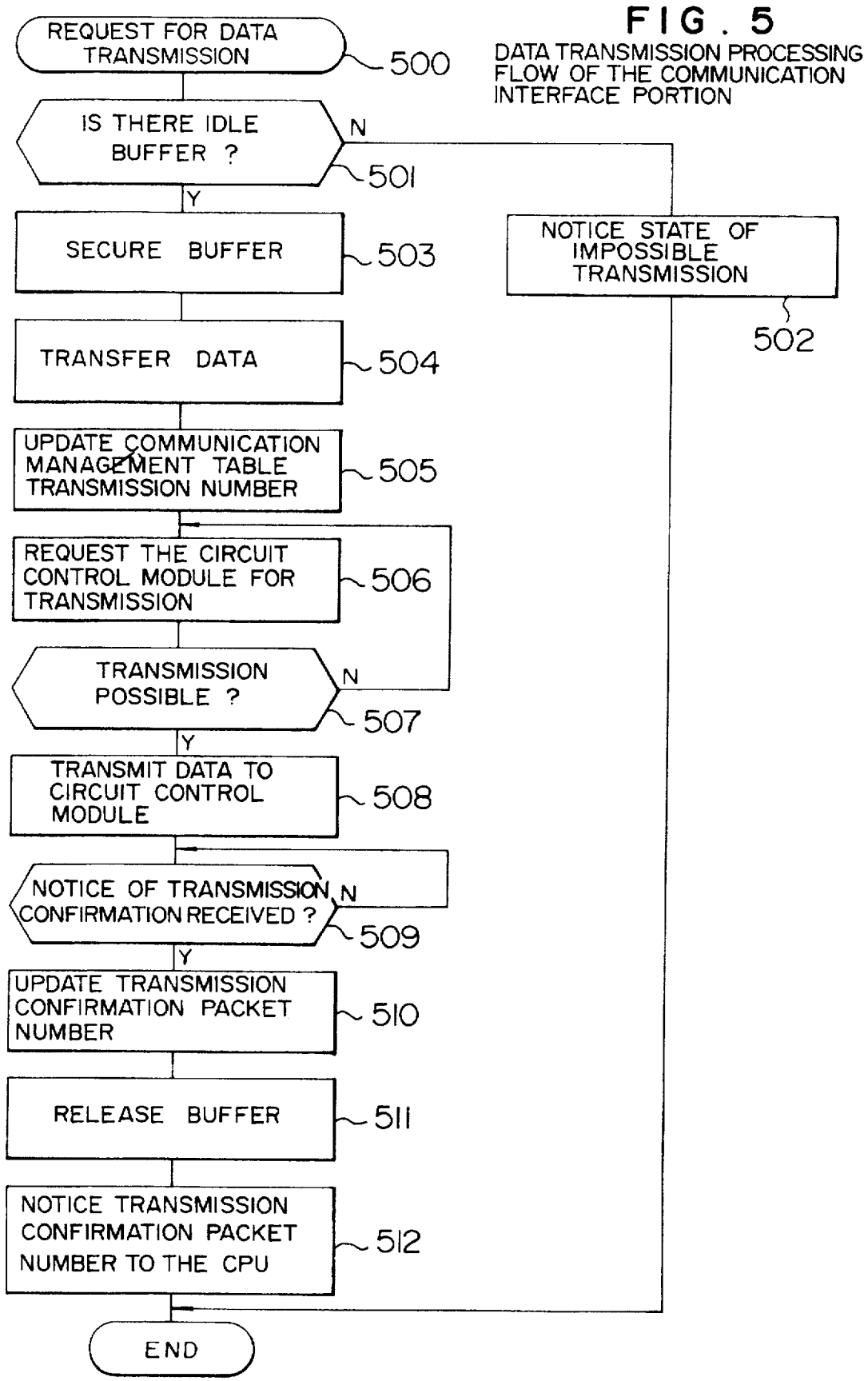
FIG. 5 is a flow chart for showing the data transmission processing of the communication interface portion.

FIG. 5 shows the flow of processings for the control of the data communication table and the communication buffer of the communication interface portion 130 in data transmission. When editing of data to be transmitted to the terminal has been finished by the program operated on the CPU 110, a space is secured on the communication buffer 127 on the main storage 120 for the data to be transmitted. Then, the transmission packet number 122 of the data communication management table 121 is updated and the data is transferred to the communication interface portion 130. In this case, a transmission packet number corresponding to the transfer data is attached to this data as additional information of the transfer data. In the communication interface portion 130, a data transfer request from the CPU 110 is received by the CPU communication processing which is operated on the microprocessor 136 of the communication interface portion 130 (Step 500). The buffer idle management processing 310-b which is also operated on the microprocessor 136 of the communication interface portion 130 starts operation to check whether there is an idle space in the buffer (Step 501). When there is no idle space, it is noticed to the CPU 110 that it is not possible to receive transferred data (Step 502). When there is an idle space, a required volume of buffer space is secured (Step 503). The data is transferred to the secured buffer space from the main storage 120 (Step 504). When the data transfer has been completed, the packet number management processing 310-a updates the transmission packet number 132 of the data communication management table 131 to the packet number received from the CPU 110 as the latest information (Step 505). Then the packet is sent to the multi-circuit control unit communication processing 340. The multi-circuit control unit communication processing 340 sends a packet transmission request to the circuit control module 160 of the multi-circuit control unit 140 (Step 506). When the circuit control module 160 can not receive data as a result of receiving a response from the circuit control module 160 at the transmission request (Step 507), the circuit control module 160 waits until it can receive the data. When the circuit control module 160 can receive the data, the data is transmitted to the circuit control module 160 (Step 508). A notice of confirmation of the receiving of the data from the terminal is waited from the circuit control module 160 (Step 509). When the notice of confirmation of the receiving of data from the terminal has been received from the circuit control module 160 in the multi-circuit control unit communication processing 340, this is noticed to the packet number management processing 310-a. The packet number management processing 310-a updates the transmission confirmation packet number 133 of the data communication management table 131 to the latest number (Step 510). The buffer idle management processing 310-b checks if there is an equal number between the transmission confirmation packet number after the above updating and the packet number which has been registered as the buffer additional information for the buffer of which release has been awaited. If there is an equal number, the buffer having the equal packet number is released (Step 511), and a notice of confirmation of the completion of packet transmission up to the transmission confirmation packet number 133 in the communication management table 131 is sent to the CPU 110 (Step 512). When the CPU has received the notice of confirmation of the completion of packet transmission, the packet number is updated to the number of receiving the notice of the transmission confirmation packet number 123 on the data communication management table 121 on the main storage 120, and then the buffer corresponding to this packet number is released.

Figure 6:
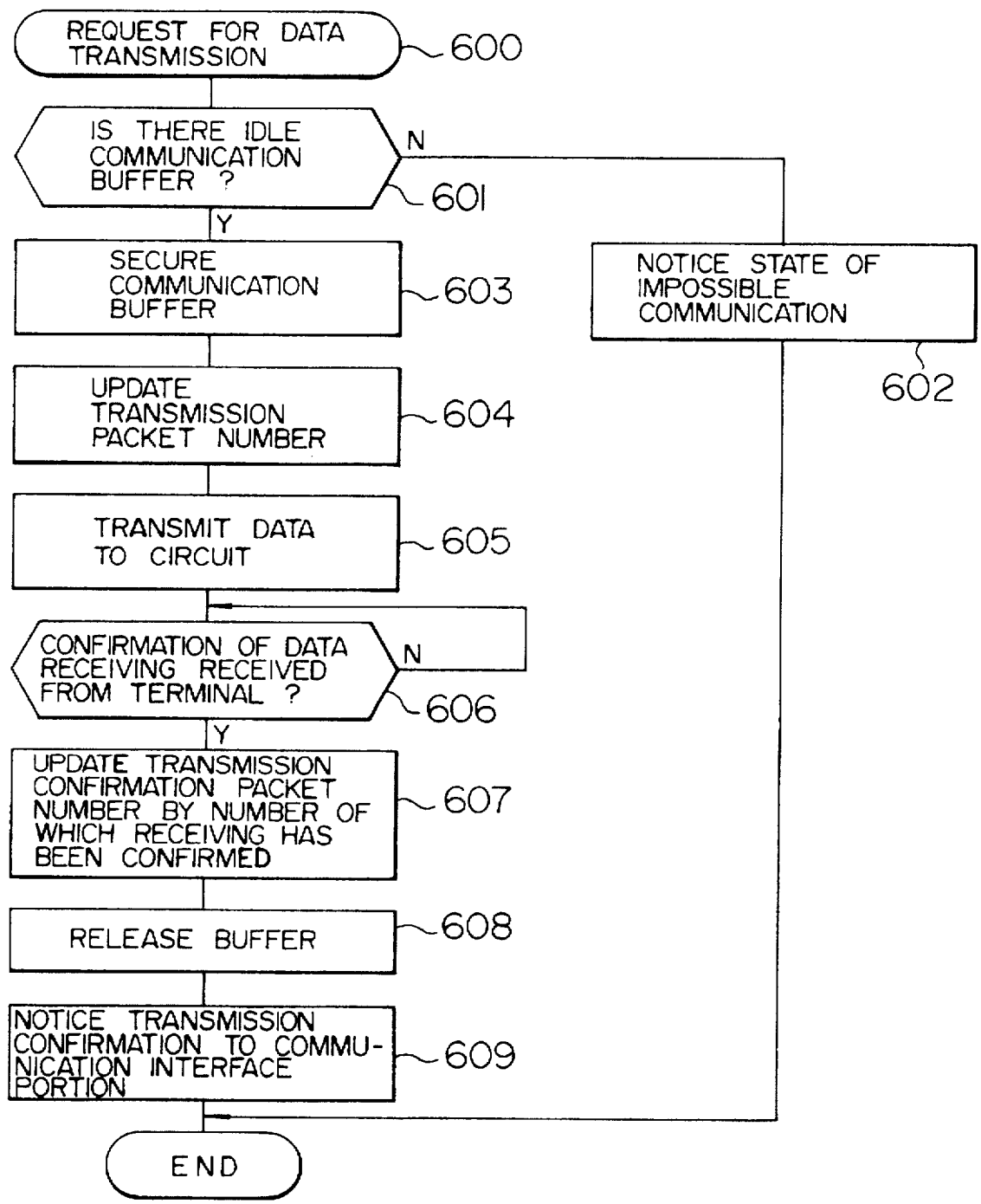
FIG. 6 is a flow chart for showing the data transmission processing of the circuit control module.

FIG. 6 shows the flow of data transmission processing in the circuit cotnrol module. When the bus interface processing 420 operated on the microprocessor 166 of the circuit control module 160 has received the request for data transmission from the communication interface portion 130 sent in Step 506 in FIG. 5 (Step 600), the buffer idle management processing 410-a checks whether there is an idle buffer space in the communication buffer 167 (Step 601). If there is no idle space, it is noticed to the communication interface portion 130 that it is not possible to receive transmitted data (Step 602). If there is an idle space in which data can be received from the communication interface portion 130, the communication buffer is secured (Step 603). The packet management processing 410-b updates the transmission packet number of the data communication management table 161 (Step 604). Then, the packet is sent to the circuit control processing 430. The circuit control unit 430 transmits the received packet to the terminal through the circuit 180 (Step 605). The circuit control processing 430 waits for the receiving of the confirmation of the receiving of the transmitted packet at the data link level of the terminal (Step 606). Upon receiving the confirmation of the receiving of the packet at the data link level of the terminal, the circuit control processing 430 notices this receiving to the packet number management processing 410-b. The packet number management processing 410-b updates the transmission confirmation packet number 163 of the data communication management table 161 by the number of receiving confirmed by the terminal (Step 607). The buffer idle management processing 410-a releases the buffer of the area occupied by the updated transmission confirmation packet number (Step 608). Then, a request is made to the buffer interface processing 420 that a notice should be made to the communication interface portion 130 that a confirmation of the receiving of data of the packet number corresponding to the released buffer has been received from the terminal (Step 609), and the confirmation of data transmission is noticed to the communication interface portion.

Data transmission to the terminal from the host computer 100 and the control of the sequence of the packet number and buffer control at the time of receiving the confirmation of data receiving from the terminal are carried out in the manner as described above.

Figure 7:
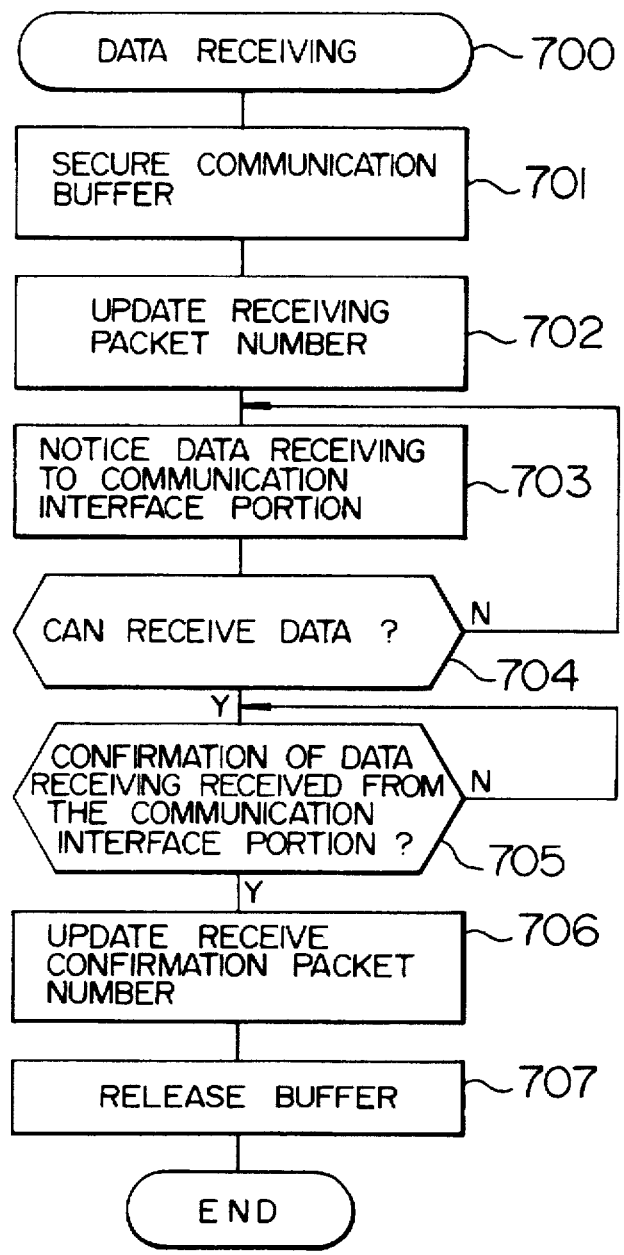
FIG. 7 is a flow chart for showing the data receiving processing of the circuit control module.

FIG. 7 shows the flow of processing for receiving data in the circuit control module 160. When data has been received from the terminal in the circuit control processing 430 of the circuit control module 160 (Step 700), the buffer idle management processing 410-a secures the buffer (Step 701), and stores the received data in this buffer. Then, the circuit control processing 430 notices the receiving of data to the packet number management processing 410-b. The packet number management processing 410-b updates the receiving packet number 164 of the data communication management table 161 (Step 702). Then, a request is made to the bus interface processing 420 that a notice should be made to the communication interface portion 130 that data has been received from the terminal (Step 703), and a response from the communication interface portion 130 is awaited (Step 704). When it is not possible to receive data, data is awaited until it becomes possible to receive data. When it has become possible to receive data, it is waited until the communication interface portion 130 reads data and makes notice of the confirmation of the data receiving to the circuit control module 160 (Step 705). Upon receiving the confirmation of the data receiving, the packet number management processing 410-b updates the receiving confirmation packet number 165 on the data communication management table 161 (Step 706). Then, the buffer idle management processing 410-a releases the buffer of the area which has been secured by the updated receiving confirmation packet number (Step 707).

FIG. 8 shows the flow of processings for receiving data in the communication interface portion 130. When the notice of receiving data from the terminal has been received from the circuit control module 160 in the multi-circuit control unit communication processing 340 (Step 800), the buffer idle management processing 310-b checks whether there is an idle space in the buffer 137 (Step 801). If there is no idle space, a notice is made to the circuit control module 160 that it is not possible to receive data (Step 802). If there is an idle space, a necessary volume of buffer is secured (Step 803). Then, data is transferred to the secured buffer from the circuit control module 160 (Step 804). When the data transfer has been completed, the packet number management processing 310-a updates the receiving packet number 134 of the data communication management table 131 to the packet number received from the circuit control module 160 as the latest information (Step 805). Then the packet is sent to the CPU communication processing 320. The CPU communication processing 320 sends a request to the CPU 110 for sending the notice of receiving data (Step 806). As a result of receiving the response from the CPU 110 at the request (Step 807), if the CPU 110 can not receive data, data is awaited until it can be received. When data can be received, data is transmitted to the CPU 110 (Step 808). Then, the notice of confirmation of receiving data is waited from the CPU 110 (Step 809). When the notice of confirmation of receiving data has been received from the CPU 110 in the CPU communication processing 320, this is noticed to the packet number management processing 310-a. The packet number management processing 310-a updates the receiving confirmation packet number 135 of the data communication management table 131 to the latest number (Step 810). The buffer idle management processing 310-b checks if there is an equal number between the receiving confirmation packet number after the updating and the packet number which has been registered as additional information of the buffer of which release has been awaited. If there is an equal number, the buffer having the equal packet number is released (Step 811), and the notice of confirmation of the completion of receiving packets up to the receiving confirmation packet number 135 in the communication management table 131 is sent to the circuit control module 160 (Step 812).

The processings which are carried out to guarantee data continuity when an abnormal state has occurred and the communication interface portion 130 is to be changed over will be explained with reference to FIGS. 9 to 11.

FIG. 9 shows the operation to be carried out when the CPU 110 and the circuit control module 160 have detected the occurrence of an abnormal state in either the current operating communication interface portion 130 or the current operating computer interface module 150. The CPU 110 either detects the occurrence of an abnormal state of data communications with the communication interface portion 130 or receives a notice of the occurrence of an abnormal state in the communication interface portion 130 itself or the computer interface module 150 detected as a result of self-diagnosis of the communication interface portion 130 or the monitor processing of the multi-circuit control unit 140. Upon receiving the notice of the occurrence of an abnormal sate, the CPU 110 restricts the transmission to the portion of the occurrence of the abnormal state except the portions which require change-over of the units and separates the portion of the occurrence of the abnormal state from the communication system. When an abnormal state has occurred in the communication interface portion 130, the abnormal communication interface portion 130 is separated from the computer bus 170 of the host computer 100. When an abnormal state has occurred in the computer interface module 150 of the multi-circuit control unit 140, an instruction is given to the communication interface portion 130 to separate the computer interface module 150. Then, the CPU 110 sends a change-over request to the stand-by communication interface portion 230 so that this communication interface portion 230 becomes the current operating system. Upon receiving the change-over request from the CPU 110, the stand-by communication interface portion 230 notices to all the circuit control modules 160 of the multi-circuit control unit 140 through the computer interface module 250 which becomes the new operating system that the communication interface portion is being changed over. The circuit control module 160 which has received the notice of the state that the communication interface portion is being changed over controls the communication state in the structure control processing 440 so that the state of waiting for the change-over of the communication interface portion is set to thereby restrict communications with the communication interface portion 230 except the transmission of necessary data to the communication interface portion 230 according to the instruction of request for the transmission of information necessary for the change-over of the communication interface portion 230, until the notice of restarting of communications is received from the communication interface portion 230 after it has become the new operating system. When the occurrence of an abnormal state of communications has been detected in the data communication processing 410 at the time of making a transmission to the communication interface portion 130 in the circuit control module 160, the occurrence of the abnormal state of communications is noticed to the structure control processing 440 of the circuit control module 160. Then, the structure control processing 440 regards that an abnormal state has occurred at some portion between the communication interface portion 130 and the circuit control module 160, and sets the communication state to the state of the occurrence of an abnormal state in the computer communication path. Then, the structure control processing 440 stores the processing at the time of the occurrence of the abnormal state and sets the state to the state of waiting for the change-over of the communication interface portion.

Figure 10A:
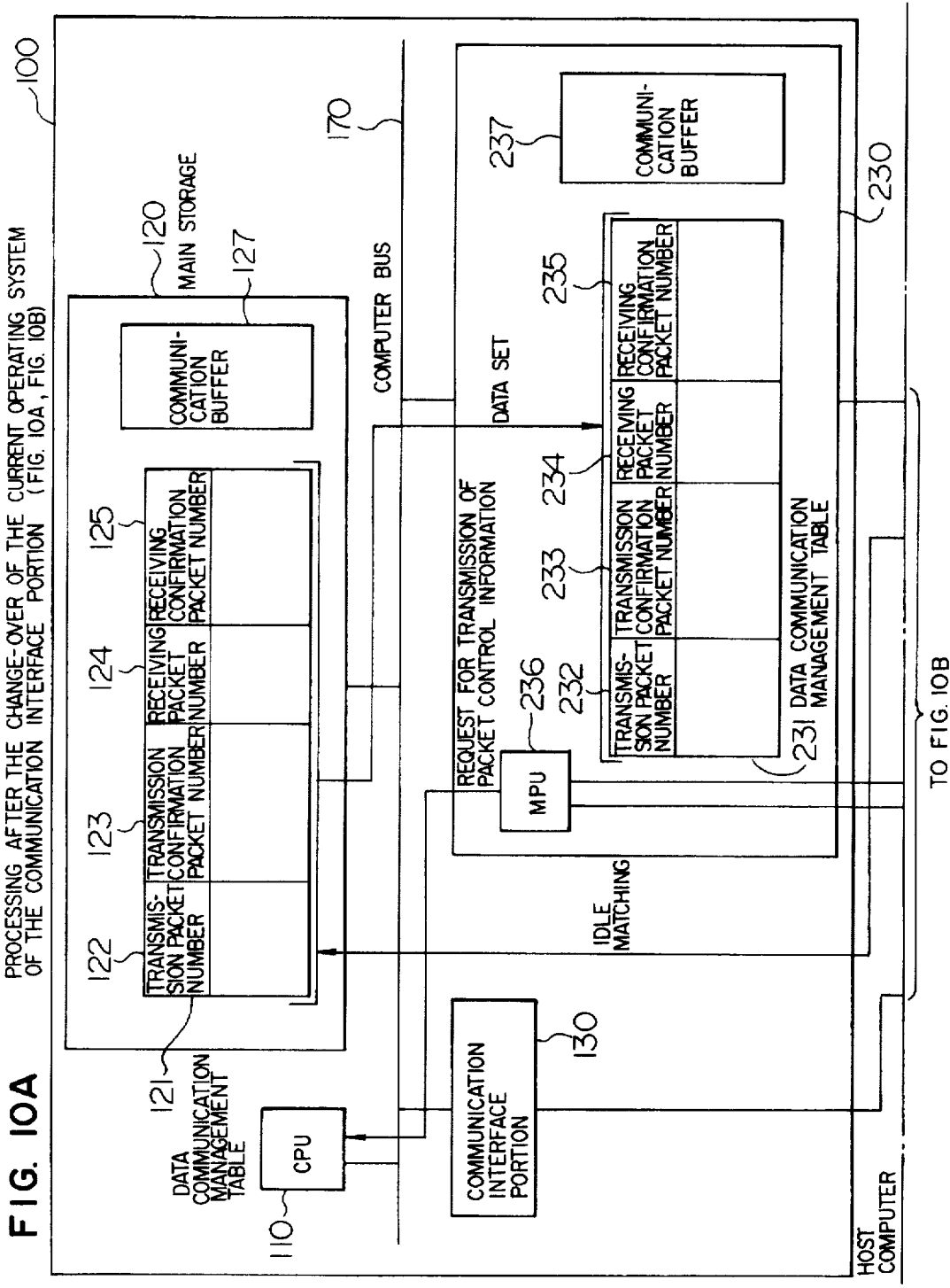
FIGS. 10A and 10B are diagrams for showing the information flow after the communication interface portion has been changed over a new current operating system.
Figure 10B:
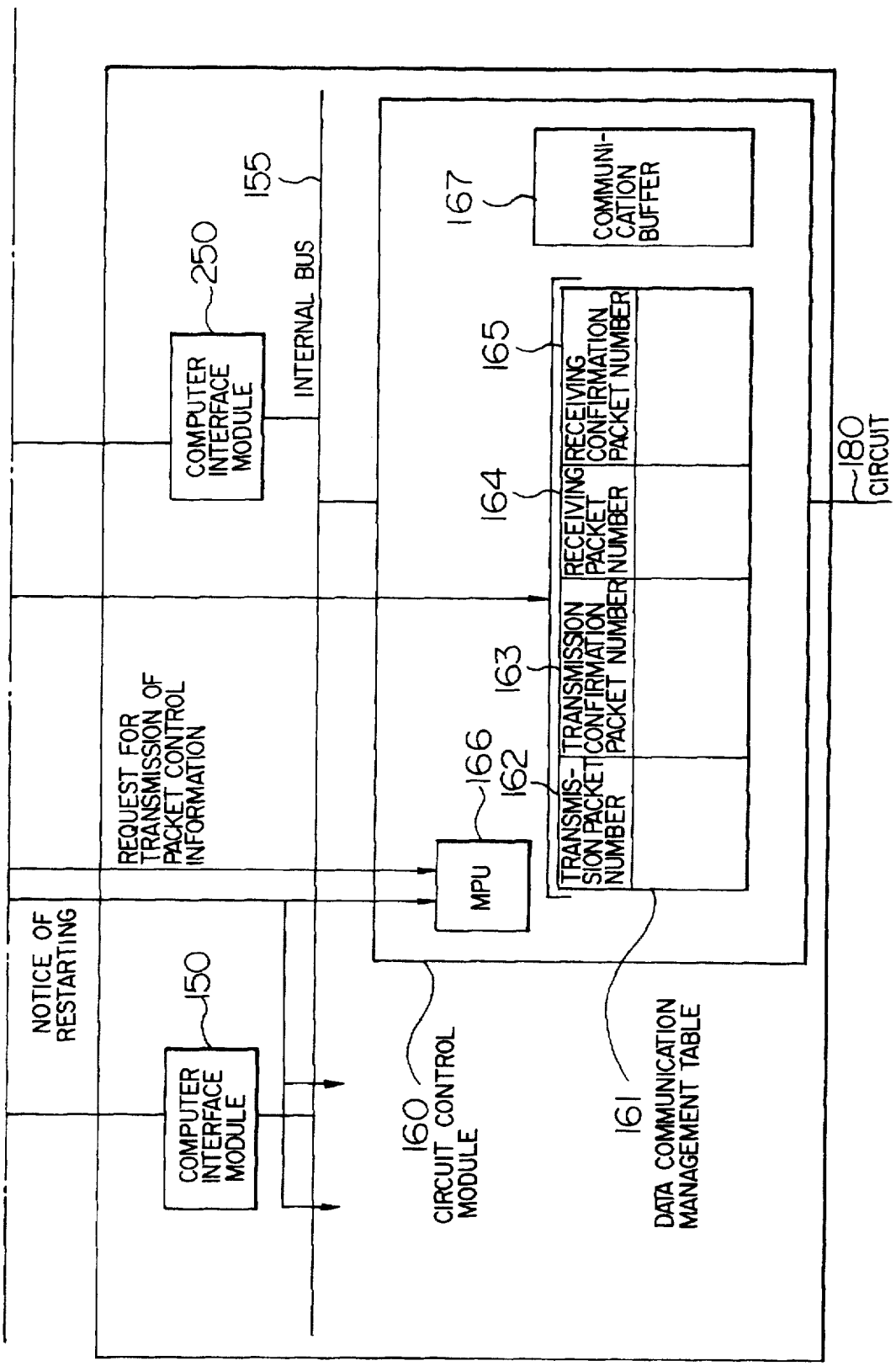

FIGS. 10A and 10B show the schematic view of the processing of the CPU 110 and the communication interface portion 230 until they restart the communication operation after the communication interface portion has been changed over to the new current operating system. FIGS. 11A and 11B show the flow of the interanl processings of the communication interface portion 230 which has become the new operating system. When the communication interface portion has been changed over to the new current operating system of the communication interface portion 230 (Step 1100), the communication interface portion 230 requests the CPU 110 and the circuit control module 160 for the transmission of packet control information in order to check to which level data transmission and receiving have been completed in the circuit control module corresponding to the portion of the occurrence of an abnormal state (Steps 1101 and 1102). In other words, when an abnormal state has occurred in the communication interface portion 130, the request for the transmission of packet control information is made to all the circuit control modules under the control of the changed-over communication interface portion 230, and when an abnormal state has occurred in the computer interface module 150 of the multi-circuit control unit 140, the request is made to all the circuit control modules of the multi-circuit control unit 140 to which the computer interface module 150 belongs. When the circuit control module 160 has received the request for transmitting the packet control information from the respective communication interface portions 230, the circuit control module 160 transmits the content of the data communication management table 161 of all the circuits managed by the circuit control module 160 to the communication interface portion 230 through the communication interface portion 260. The CPU 110 transmits the content of the communication management table 121 managed on the main storage 120. Upon receiving the packet control information from the circuit control module 160 and the CPU 110, the communication interface portion 230 compares the content of the received information (Step 1103). As a result of the comparison, the circuit for which the data transmission and receiving state recognized by the CPU 110 is the same as the data transmission and receiving state of the circuit control module 160 sets the content same as the data communication management table 121 managed on the main storage 120 to the data communication management table 231 of the communication interface portion 230 which has become the new operating system (Step 1104). Then, the transmission packet number 122 of the data communication management table 121 is compared with the transmission confirmation packet number 123 (Step 1105). When these numbers are different, the packets from the packet of the packet number next to the transmission confirmation packet number to the packet of the transmission packet number are retransmitted to the communication interface portion 230 (Step 1106). When the packet numbers are the same, data transfer is not carried out. Then, all the circuits are checked to see whether matching check has been completed (Step 1107). When the matching check has been completed, completion of the change-over is noticed to the CPU 110 (Step 1108). When the matching check has not been completed for all the circuits, the processings from Step 1103 are repeated. For the circuits in which the data transmission and receiving states are different between the CPU 110 and the circuit control module 160 as a result of the comparison in Step 1103, the following processings are carried out.

First, it is checked whether the transmission packet numbers are the same or not (Step 1109). If the transmission packet numbers are different, it is recognized that some of the data of which transmission was requested by the CPU 110 has not yet been transmitted to the circuit control module 160, and the value which is the same as the one on the data communication table 121 managed in the main storage 120 is set to the data communication management table 231 of the communication interface portion 230 which has become the new current operating system (Step 1110). Data for the transmission packet number which is different between the CPU 110 and the circuit control module 160 is registered as the first retransmission data to be retransmitted to the communication interface portion 230 which has become the new operating system (Step 1111). When the transmission packet numbers are the same, no processing is carried out. Next, it is checked whether the transmission confirmation packet numbers are different or not (Step 1112). If the transmission confirmation packet numbers are different, it is assumed that the transmission has been confirmed in the communication interface portion 230 up to the transmission packet confirmed in the circuit control module 160, and the same value is registered in the transmission confirmation packet number 233 of the data communication management table 231 (Step 1113). It is set that the transmission confirmation is noticed to the CPU by the portion of different transmission confirmation packet numbers. No processing is carried out when the transmission confirmation packet numbers are equal. Then, the transmission confirmation packet number 233 is compared with the transmission packet number 232 which has been newly registered in the data communication management table 231 of the communication interface portion 230 (Step 1114). When the two packet numbers are different, the packets from the packet of the number next to the transmission confirmation packet number to the last number of the packet number registered as the first transmission data are registered as second retransmission data which is the data that have been transmitted but transmission confirmation of which has not been received (Step 1115). The communication buffer 237 of the communication interface portion 230 is secured and then the second retransmission data is transferred to this buffer so that transmission confirmation is awaited. Then, the first retransmission data is transferred to the communication buffer and transmission to the circuit control module 160 is awaited. No processing is carried out when the transmission number is equal to the transmission confirmation number. Next, it is checked whether the receiving packet numbers are different or not (Step 1116). If the receiving packet numbers are different, the receiving packet number 124 on the data communication management table 121 in the main storage 120 is registered in the receiving packet number 234 of the communication interface portion 230 (Step 1117). Then, an instruction is given to send a request to retransmit data of different packet numbers to the circuit control module 160 (Step 1118). No processing is carried out when the receiving packet numbers are equal. Last, it is checked whether the receiving confirmation packet numbers are different or not (Step 1119). If the receiving confirmation packet numbers are different, the receiving confirmation packet number 125 on the data communication management table 121 in the main storage 120 is registered in the receiving confirmation packet number 235 of the communication interface portion 230 (Step 1120). Then, it is set that the notice of confirmation of receiving data of different packet numbers is retransmitted to the circuit control module 160 (Step 1121). No processing is carried out when the receiving confirmation packet numbers are equal. When all the circuits to be processed have been processed, the notice of completion of the change-over is sent to the CPU. Upon receiving the notice of completion of the change-over, the CPU recognizes that the portion of the occurrence of an abnormal state has been changed over, and sends the notice of restarting the communication to the communication interface portion 230. Then, the CPU cancels the state of restricting data transmission to the communication interface portion 230 and returns to the normal communication state. Upon receiving the notice of restarting the communications from the CPU, the communication interface portion 230 notices the restarting of the communications to all the circuit control modules 160 that have been changed over, and returns to the normal communication state. Upon receiving the notice of restarting the communications, the circuit control module 160 cancels the state of restricting transmission to the communication interface portion 230, and returns to the normal communication state.

As described above, according to the present embodiment, the data transmission and receiving confirmation between the host unit and the terminal at the data link level of the circuit is also applied to the section between the circuit control module 160 and the CPU 110. Therefore, it is possible to guarantee the data integrity during the normal data communications without using a special protocol. Further, even if a fault has occurred at a duplexed portion of the host unit, for example, particularly at the communication interface portion and the computer interface module, and the communication interface portion is to be changed over from the current operating system to the stand-by system, it is possible to reproduce the cotnrol information of data communications that has been lost due to the change-over, from the control information of data communications held by the CPU and the circuit control module adjacent to the communication interface portion, so that the state before the change-over can be obtained. Thus, it is possible to guarantee data integrity for both transmission and receiving data.

Figure 12B:
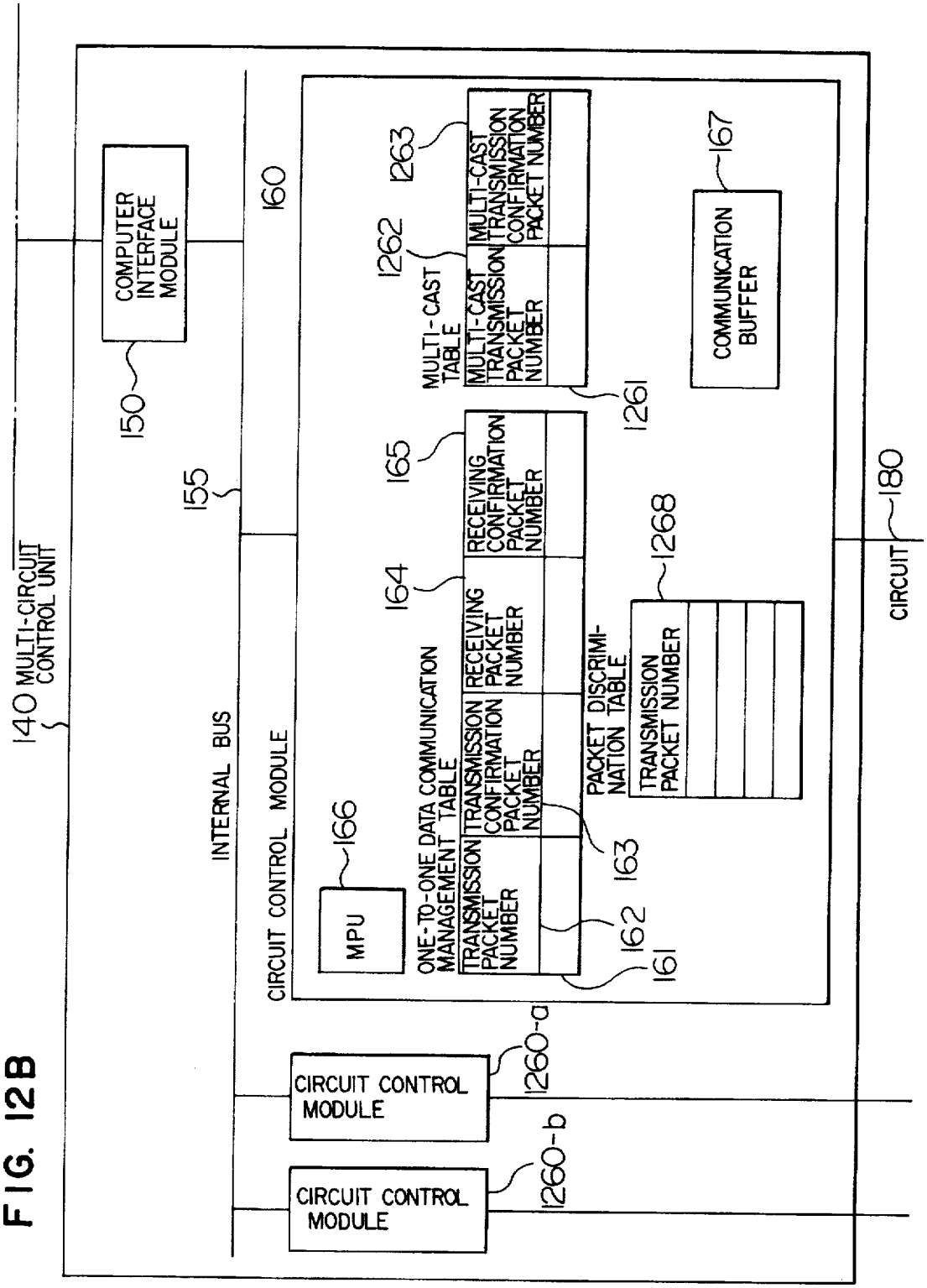

FIGS. 12A and 12B show another embodiment of the present invention. Description will be made of the processing procedure for the case where both one-to-one communication mode and multi-cast communication mode exist, with reference to FIGS. 12A and 12B.

In order to enable multi-cast communications, a data communication management table for multi-caster is provided to each of the CPU 110, the communication interface portion 130 and the circuit control module 160, in addition to the data communication management information shown in FIGS. 1A and 1B. Further, a communication buffer for multi-caster is provided in the main storage 120 and the communication interface portion 130. A multi-cast number counter 1228 to be managed by the CPU 110 is provided on the main storage 120, and a packet discrimination table 1268 for discriminating whether the data packet under transmission to the circuit is for one-to-one communications or for multi-cast communications is provided in the circuit control module 160. In the multi-cast communications, data integrity is also guaranteed during the normal data communications, by operating the communication management table and the communication buffer at the time of data transmission and at the time of transmission confirmation, in the same manner as the data communications according to one-to-one communications. A multi-cast communication table 1221 and a multi-cast number counter 1228 are provided in the main storage 120. The multi-cast communication table 1221 has a multi-cast number 1222 for waiting for the transmission confirmation, a data generation source 1223 and a final multi-cast number 1224 as structure element. This table corresponds to the current operating communication interface portion 130. A multi-cast communication table 1231 and a communication buffer 1237 for multi-cast are provided in the communication interface portion 130. The multi-cast communication table 1231 has a multi-cast number 1232 for waiting for transmission confirmation, a final multi-cast number 1233, a transmission destination 1234 and a transmission confirmation packet number 1235 corresponding to it as structure elements. The circuit control module 160 has a multi-cast table 1261 and a packet discrimination table 1268 for multi-cast. The multi-cast table 1261 has a transmission packet number 1262 and a transmission confirmation packet number 1263 as structure elements. In order to discriminate between data for one-to-one communications and data for multi-cast communications in the circuit control module 160, a packet number for showing the data is for one-to-one communications or for multi-cast communications is added as additional infromation when a packet is transmitted from the communication interface portion 130 to the circuit control module 160. Then, the packet number is registered in the packet discrimination table 1268 when the packet is sent from the circuit control module 160. When the confirmation of completion of transmission is sent from the circuit control module 160 to the communication interface portion 130, packet numbers are taken out in the order they have been registered in the packet discrimination table 1268. The packet numbers are sent to the communication interface portion 130 as additional information of the transmission confirmation, so that the communication interface portion can discriminate whether the confirmation of transmission is for one-to-one communications or multi-cast communications. When the communication interface portion 130 has received transmission confirmation for all the packets from all the destinations corresponding to one multi-cast communications, the communication interface portion 130 notices to the CPU 110 that the multi-cast communications have been completed, and releases the corresponding buffer 1237. Upon receiving the confirmation of transmission from all the communication interface portions which have transmitted multi-cast data, the CPU 110 releases the corresponding portion of the multi-cast buffer 1227.

In the configuration of FIGS. 12A and 12B, when an abnormal state has occurred in the communication interface portion 130 or the computer interface module 150 and the current operating system is to be changed over, the same processings as the ones carried out for the reproduction of the data management table for one-to-one communications are also carried out for the reproduction of the multi-cast table, so that information that has been lost by the change-over of the communication interface portion 130 can be reproduced.

As described above, according to the present embodiment, in the communication system having a co-existence of multi-cast communications and one-to-one communications, data transfer is controlled sequentially for each of the communications so that data for communication management can be reproduced even if an abnormal state has occurred in a duplexed portion. Therefore, it is possible to guarantee data integrity both at the time of normal operation and at the time when the duplexed portion is changed over.

We claim:

1. A data integrity guarantee system for a communication system in which data packets are sent from a processor to a terminal unit via an active one of a pair of redundant communication interface portions and one of a plurality of circuit control modules and vice versa, herein said processor, said communication interface portions and said circuit control modules each contain a communication buffer for storing transmission data packets and a data communication management table having an indicator for indicating a packet number of the transmitted data packet, and an indicator for indicating a confirmation packet number which is set when a terminal unit has confirmed receipt of a corresponding data packet to a respective transmitting unit, wherein said data integrity system performs the steps of:

(a) storing data packets received from a respective sending unit in a communication buffer of a corresponding receiving unit;

(b) storing, when a data packet is sent out by said processor a packet number of said data packet in said data communication management table in said processor;

(c) storing, upon receipt in an active communication interface portion, said data packet in the communication buffer and storing in said data communication management table a packet number in the corresponding location;

(d) repeating steps (b) and (c) so as to transfer said data packet from said active communication interface portion to a communication buffer of one of said circuit control modules;

(d1) transferring the data packets from a circuit communication module to a terminal unit, which sends back a confirmation signal;

(d2) in response to said confirmation signal, updating packet numbers in said data communication management table of said circuit communication module;

(d3) releasing an area in said communication buffer in said circuit communication module containing the transmitted data packets;

(d4) passing on said confirmation signal to said communication interface portion which updates its packet numbers and releases corresponding areas in said communication buffer;

(d5) sending said confirmation signal to said processor which also updates its packet numbers and releases corresponding areas in said communication buffer;

(d6) performing steps (a) through (d5) for data packet transmission in the other direction from one of the circuit control modules to said active communication interface portion and from said active communication interface portion to said processor, where separate entries for the receiving packet numbers and the receiving confirmation packet numbers are provided in each data communication management table for this direction of data packet transmission;

(d7) when an abnormal state occurs in said active communication interface portion, interrupting data transmission in both directions;

(e) transferring data of said data communication management tables in said processor and in all circuit control modules to a data communication management table of a stand-by communication interface portion;

(f) determining, by comparing packet numbers and confirmation indicators in the various entries of said data communication management tables, whether the data packets sent by said processor have arrived at a circuit control module and vice versa;

(g) retransmitting, if a data packet has not arrived because it was in the communication buffer of an active communication interface portion when the abnormal state occurred, the data packet from the communication buffer of the sending unit and the packet numbers in the data communication management table of said stand-by communication interface portion are updated; and (h) when all entries in said data communication management table of said stand-by communication interface portion match with the corresponding entries in the data communication management tables of the processor and said circuit control modules, resuming transmission of the data packet and causing said stand-by communication interface portion to become said active communication interface portion.

2. A data integrity guarantee system according to claim 1, wherein each of said processor, said circuit control module and communication interface portion comprises:

means for detecting the number of data packets stored in the corresponding communication buffer; and means for storing the total number of data packets received by adding a serial number to each data packet.

3. A data integrity guarantee system according to claim 1, wherein said communication interface portion comprises:

means for notifying said circuit control module that restarting of communications is being prepared when the current operating communication interface portion has been changed over to the stand-by communication interface portion; and means for notifying said circuit control module that it has become possible to transmit to said communication interface portion when it has become possible to restart communications after the current operating communication interface portion was changed over to the stand-by communication interface portion.

4. A data integrity guarantee system according to claim 2, wherein said communication interface portion comprises:

means for notifying said circuit control module that restarting of communications is being prepared when the current operating communication interface portion has been changed over to the stand-by communication interface portion; and means for notifying said circuit control module that it has become possible to transmit to said communication interface portion when it has become possible to restart communications after the current operating communication interface portion was changed over to the stand-by communication interface portion.

5. A data integrity guarantee system according to claim 1, wherein confirmation signals are transmitted for each data packet separately.

6. A data integrity guarantee system according to claim 2, wherein confirmation signals are transmitted for each data packet separately.

7. A data integrity guarantee system according to claim 3, wherein confirmation signals are transmitted for each data packet separately.

8. A data integrity guarantee system according to claim 4, wherein confirmation signals are transmitted for each data packet separately.

9. A data integrity guarantee system according to claim 1, wherein said processor comprises:

means for transmitting the same data to a plurality of circuits;

wherein each of said processor and said communication interface portion comprises:

a buffer area for multi-cast, means for storing destinations of a multi-cast transmission, and means for holding in said buffer area transmission data for the multi-cast transmission until the notice of confirmation of data transmission has been received from all the destinations; and wherein said circuit control module comprises:

means for discriminating whether the transmission data received from said communication interface is based on a multi-cast transmission or a one-to-one transmission and storing the result.

10. A data integrity guarantee system according to claim 2, wherein said processor comprises:

means for transmitting the same data to a plurality of circuits; and wherein each of said processor and said communication interface portion comprises:

a buffer area for multi-cast, means for storing destinations of a multi-cast transmission, and means for holding in said buffer area transmission data for the multi-cast transmission until the notice of confirmation of data transmission has been received from all the destinations; and wherein said circuit control module comprises:

means for discriminating whether the transmission data received from said communication interface is based on a multi-cast transmission or a one-to-one transmission and storing the result.

11. A data integrity guarantee system according to claim 3, wherein said processor comprises:

means for transmitting the same data to a plurality of circuits;

wherein each of said processor and said communication interface portion comprises:

a buffer area for multi-cast, means for storing destinations of a multi-cast transmission, and means for holding in said buffer area transmission data for the multi-cast transmission until the notice of confirmation of data transmission has been received from all the destinations; and wherein said circuit control module comprises:

means for discriminating whether the transmission data received from said communication interface is based on a multi-cast transmission or a one-to-one transmission and storing the result.

12. A data integrity guarantee system according to claim 4, wherein said processor comprises:

means for transmitting the same data to a plurality of circuits;

wherein each of said processor and said communication interface portion comprises:

a buffer area for multi-cast, means for storing destinations of a multi-cast transmission, and means for holding in said buffer area transmission data for the multi-cast transmission until the notice of confirmation of data transmission has been received from all the destinations; and wherein said circuit control module comprises:

means for discriminating whether the transmission data received from said communication interface is based on a multi-cast transmission or a one-to-one transmission and storing the result.

13. A data integrity guarantee system according to claim 5, wherein said processor comprises:

means for transmitting the same data to a plurality of circuits;

wherein each of said processor and said communication interface portion comprises:

a buffer area for multi-cast, means for storing destinations of a multi-cast transmission, and means for holding in said buffer area transmission data for the multi-cast transmission until the notice of confirmation of data transmission has been received from all the destinations; and wherein said circuit control module comprises:

means for discriminating whether the transmission data received from said communication interface is based on a multi-cast transmission or a one-to-one transmission and storing the result.

14. A data integrity guarantee system according to claim 1, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

15. A data integrity guarantee system according to claim 2, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

16. A data integrity guarantee system according to claim 3, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

17. A data integrity guarantee system according to claim 4, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

18. A data integrity guarantee system according to claim 5, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

19. A data integrity guarantee system according to claim 6, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

20. A data integrity guarantee system according to claim 7, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

21. A data integrity guarantee system according to claim 8, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

22. A data integrity guarantee system according to claim 9, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

23. A data integrity guarantee system according to claim 10, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

24. A data integrity guarantee system according to claim 11, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

25. A data integrity guarantee system according to claim 12, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

26. A data integrity guarantee system according to claim 13, wherein each communication interface portion comprises:

means for dividing transmission data transmitted from said processor into each said data packet;

means for allocating a sequential number to each divided packet;

means for storing a data name of said transmission data transmitted from said processor and a sequential number of said divided sequential number by corresponding said data name with said sequential number; and means for collecting said confirmation signal received for each said data packet from said circuit control module, in said transmission data transmitted from said processor.

27. A method of guaranteeing data integrity for a communication system in which data packets are sent from a processor to a terminal unit via an active one of a pair of redundant communication interface portions and one of a plurality of circuit control modules and vice versa, wherein said processor, said communication interface portions and said circuit control modules each contain a communication buffer for storing transmission data packets and a data communication management table comprising an indicator for indicating a packet number of the transmitted data packet, and an indicator for indicating a confirmation packet number which is set when the terminal unit has confirmed the receipt of the corresponding data packet to the respective transmitting unit, said method comprising the steps of:

(a) storing data packets received from a respective sending unit in a communication buffer of a corresponding receiving unit;

(b) storing, when a data packet is sent out by said processor a packet number of said data packet in said data communication management table in said processor;

(c) storing, upon receipt in an active communication interface portion, said data packet in the communication buffer and storing in said data communication management table a packet number in the corresponding location;

(d) repeating steps (b) and (c) so as to transfer said data packet from said active communication interface portion to a communication buffer of one of said circuit control modules;

(d1) transferring the data packets from a circuit communication module to a terminal unit, which sends back a confirmation signal;

(d2) in response to said confirmation signal, updating packet numbers in said data communication management table of said circuit communication module;

(d3) releasing an area in said communication buffer in said circuit communication module containing the transmitted data packets;

(d4) passing on said confirmation signal to said communication interface portion which updates its packet numbers and releases corresponding areas in said communication buffer;

(d5) sending said confirmation signal to said processor which also updates its packet numbers and releases corresponding areas in said communication buffer;

(d6) performing steps (a) through (d5) for data packet transmission in the other direction from one of the circuit control modules to said active communication interface portion and from said active communication interface portion to said processor, where separate entries for the receiving packet numbers and the receiving confirmation packet numbers are provided in each data communication management table for this direction of data packet transmission;

(d7) when an abnormal state occurs in said active communication interface portion, interrupting data transmission in both directions;

(e) transferring data of said data communication management tables in said processor and in all circuit control modules to a data communication management table of a stand-by communication interface portion;

(f) determining, by comparing packet numbers and confirmation indicators in the various entries of said data communication management tables, whether the data packets sent by said processor have arrived at a circuit control module and vice versa;

(g) retransmitting, if a data packet has not arrived because it was in the communication buffer of an active communication interface portion when the abnormal state occurred, the data packet from the communication buffer of the sending unit and the packet numbers in the data communication management table of said stand-by communication interface portion are updated; and (h) when all entries in said data communication management table of said stand-by communication interface portion match with the corresponding entries in the data communication management tables of the processor and said circuit control modules, resuming transmission of the data packet and causing said stand-by communication interface portion to become said active communication interface portion.

28. A method of guaranteeing data integrity according to claim 27, wherein transmission confirmation signals are transmitted for each data packet separately.

29. A method of guaranteeing data integrity according to claim 27, further comprising the steps of:

detecting the number of data packets of said transmission data to be transmitted to said circuit control module and storing the accumulated number of data packets for each circuit as first information in the corresponding unit; and detecting the number of data packets of said transmission data to be transmitted to said terminal unit and storing the accumulated number of data packets for each circuit as second information in said communication interface portion, wherein said state of storage is said first information and second information.

30. A method of guaranteeing data integrity according to claim 28, further comprising the steps of:

detecting the number of data packets of said transmission data to be transmitted to said circuit control module and storing the accumulated number of data packets for each circuit as first information in the corresponding unit; and detecting the number of data packets of said transmission data to be transmitted to said terminal unit and storing the accumulated number of data packets for each circuit as second information in said communication interface portion, wherein said state of storage is said first information and second information.

31. A method of guaranteeing data integrity according to claim 27, further comprising the steps of:

storing a plurality of destinations of each of said transmission data for a multi-cast transmission, in the processor and circuit control modules;

holding said transmission data for said multi-cast transmission in the corresponding communication buffer until transmission to all of said destinations has been confirmed; and storing said transmission data for said multi-cast transmission in said third memory separate from said transmission data according to one-to-one transmission.

32. A method of guaranteeing data integrity according to claim 28, further comprising the steps of:

storing a plurality of destinations of each of said transmission data for a multi-cast transmission, in the processor and circuit control modules;

holding said transmission data for said multi-cast transmission in the corresponding communication buffer until transmission to all of said destinations has been confirmed; and storing said transmission data for said multi-cast transmission in said third memory separate from said transmission data according to one-to-one transmission.

33. A method of guaranteeing data integrity according to claim 29, further comprising the steps of:

storing a plurality of destinations of each of said transmission data for a multi-cast transmission, in the processor and circuit control modules;

holding said transmission data for said multi-cast transmission in the corresponding communication buffer until transmission to all of said destinations has been confirmed; and storing said transmission data for said multi-cast transmission in said third memory separate from said transmission data according to one-to-one transmission.

34. A method of guaranteeing data integrity according to claim 30, further comprising the steps of:

storing a plurality of destinations of each of said transmission data for a multi-cast transmission, in the processor and circuit control modules;

holding said transmission data for said multi-cast transmission in the corresponding communication buffer until transmission to all of said destinations has been confirmed; and storing said transmission data for said multi-cast transmission in said third memory separate from said transmission data according to one-to-one transmission.

* * * * *